US012647177B2

(12) United States Patent
Sakamoto et al.

(10) Patent No.: US 12,647,177 B2
(45) Date of Patent: Jun. 2, 2026

(54) WIRELESS COMMUNICATION SYSTEM, RELAY APPARATUS, WIRELESS COMMUNICATION METHOD AND PROGRAM

(71) Applicant: NTT, Inc., Tokyo (JP)

(72) Inventors: Kazumitsu Sakamoto, Musashino (JP); Yosuke Fujino, Musashino (JP); Daisuke Goto, Musashino (JP); Yasuyoshi Kojima, Musashino (JP); Kiyohiko Itokawa, Musashino (JP)

(73) Assignee: NTT, Inc., Tokyo (JP)

( * ) Notice: Subject to any disclaimer, the term of this patent is extended or adjusted under 35 U.S.C. 154(b) by 375 days.

(21) Appl. No.: 18/268,397

(22) PCT Filed: Dec. 25, 2020

(86) PCT No.: PCT/JP2020/048810
§ 371 (c)(1),
(2) Date: Jun. 20, 2023

(87) PCT Pub. No.: WO2022/137527
PCT Pub. Date: Jun. 30, 2022

(65) Prior Publication Data
US 2024/0031015 A1     Jan. 25, 2024

(51) Int. Cl.
*H04B 7/185*     (2006.01)
*H04B 7/195*     (2006.01)
(52) U.S. Cl.
CPC ......... *H04B 7/18539* (2013.01); *H04B 7/195* (2013.01)
(58) Field of Classification Search
CPC .... H04B 7/18539; H04B 7/195; H04B 7/155; H04B 7/185
See application file for complete search history.

(56) References Cited

U.S. PATENT DOCUMENTS 6,370,126 B1 * 4/2002 De Baere ........... H04B 7/18539
                                  455/12.1
9,113,496 B2 * 8/2015 Lim .................... H04W 84/047
(Continued)

FOREIGN PATENT DOCUMENTS

CN        102570007 A   *   7/2012
JP        2013135457 A   *   7/2013

OTHER PUBLICATIONS

Shachi; P., "Relay-Based Co-Operative Commu !cation for Wireless Networks—A Survey", International Journal of Research Science and Management, vol. 3 No. 7 (2016), 65-71. Retrieved from http://ijrsm.com/index.php/journal-ijrsm/article/view/555 (Year: 2016).*
(Continued)

*Primary Examiner* — Shah M Rahman
(74) *Attorney, Agent, or Firm* — Harness, Dickey & Pierce, P.L.C.

(57) ABSTRACT

A relay apparatus includes a receiver, a received waveform recorder, a number-of-antennas determiner, and a transmitter. The receiver receives wireless first signals transmitted from the first communication apparatus through a plurality of receiving antennas. The received waveform recorder generates waveform data of the first signals received by the respective plurality of receiving antennas. The number-of-antennas determiner determines the number of receiving antennas according to a relay apparatus position on the basis of information regarding communication quality between the first communication apparatus and the relay apparatus at the relay apparatus position. The transmitter transmits second signals indicating the waveform data of the first signals received by the respective receiving antennas of the number of receiving antennas determined by the number-of-antennas determiner according to the relay apparatus position. A second communication apparatus performs reception processing of the second signals received from the relay appa- (Continued)

MOBILE RELAY STATION

START t←ts —S211

CALCULATE ANGLE OF ELEVATION BETWEEN CENTER POSITION OF COMMUNICATION AREA AND POSITION OF SATELLITE AT RECEPTION TIME t —S212

DETERMINE NUMBER OF RECEIVING ANTENNAS ON THE BASIS OF ANGLE OF ELEVATION —S213

SELECT RECEIVING ANTENNAS OF NUMBER OF RECEIVING ANTENNAS —S214

ACQUIRE WAVEFORM DATA OF SELECTED RECEIVING ANTENNAS —S215 t←t+1 —S216 ratus to acquire the waveform data and performs reception processing of the first signals indicated by the acquired waveform data to acquire data.

20 Claims, 20 Drawing Sheets

(56)                    References Cited

U.S. PATENT DOCUMENTS

2006/0105709 A1*  5/2006  Oh ........................ H04W 88/04
                                                          455/13.1
2008/0225931 A1*  9/2008  Proctor ............. H04B 7/15585
                                                          455/24
2011/0274032 A1*  11/2011  Leng .................... H04B 7/2606
                                                          370/315
2012/0219084 A1*  8/2012  Ihm ....................... H04B 7/063
                                                          375/267
2016/0165548 A1*  6/2016  Mohlmann ........ H04B 7/15535
                                                          455/522
2019/0109635 A1*  4/2019  Buer .................... H04B 7/2041
2019/0208575 A1*  7/2019  Barbieri ............ H04W 72/0446
2019/0222271 A1*  7/2019  Hoek ................... H04B 7/0456
2020/0274611 A1*  8/2020  Mendelsohn ...... H04B 7/18515
2021/0036761 A1*  2/2021  Murakami ............ H04B 7/086
2021/0050912 A1*  2/2021  Tsuzaki ............. H04B 7/18534
2021/0226681 A1*  7/2021  Raghavan ........... H04B 7/0617

OTHER PUBLICATIONS

Itokawa et al., A Novel proposal for LEO satellite MIMO systems for 920MHz band lot platform, IEICE Society Conference 2020, B-3-12, Sep. 2020.

* cited by examiner

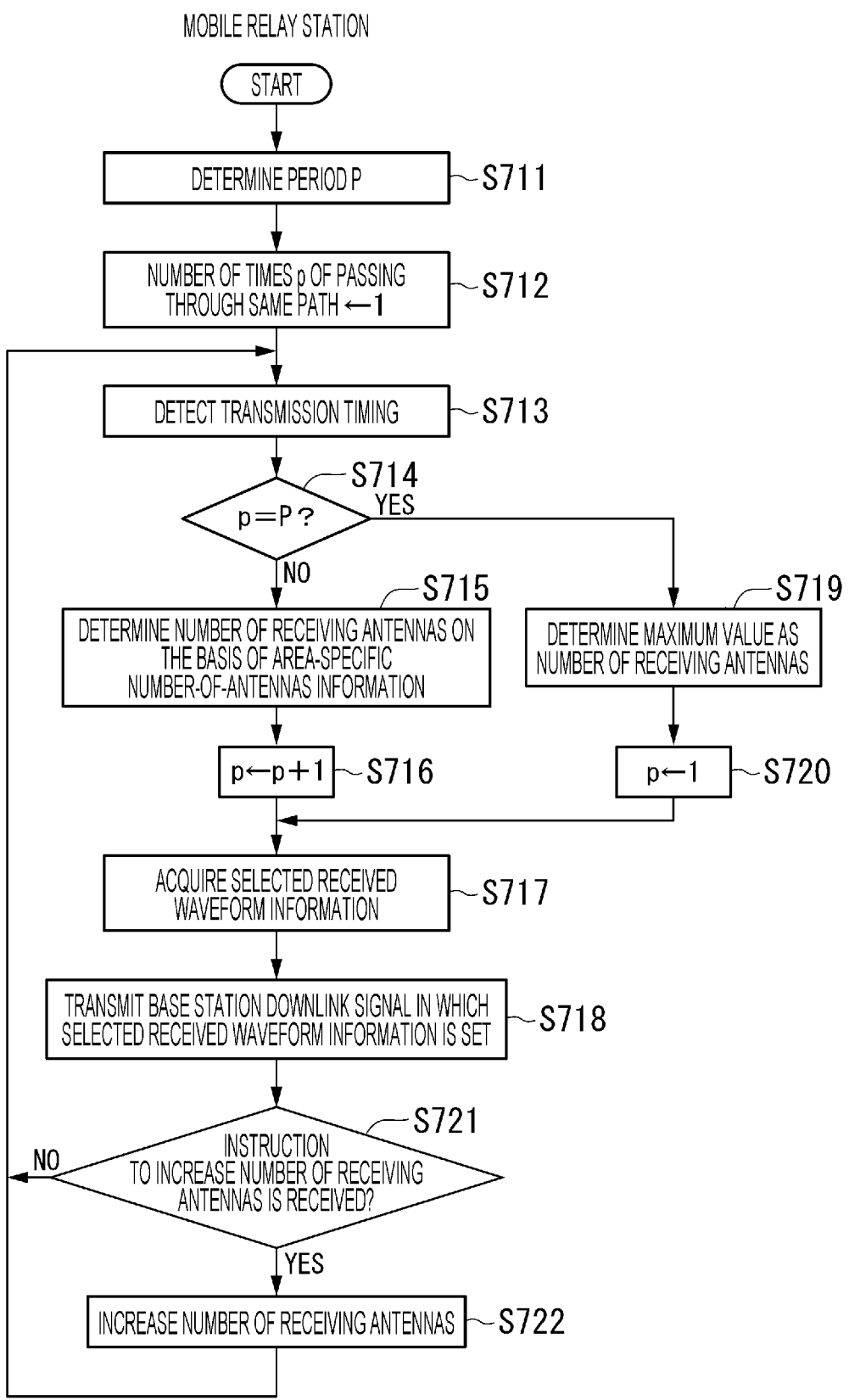

MOBILE RELAY STATION

START

DETERMINE PERIOD P — S711

NUMBER OF TIMES p OF PASSING THROUGH SAME PATH ← 1 — S712

DETECT TRANSMISSION TIMING — S713

S714
p=P ? — YES

NO

DETERMINE NUMBER OF RECEIVING ANTENNAS ON THE BASIS OF AREA-SPECIFIC NUMBER-OF-ANTENNAS INFORMATION — S715

DETERMINE MAXIMUM VALUE AS NUMBER OF RECEIVING ANTENNAS — S719 p←p+1 — S716 p←1 — S720

ACQUIRE SELECTED RECEIVED WAVEFORM INFORMATION — S717

TRANSMIT BASE STATION DOWNLINK SIGNAL IN WHICH SELECTED RECEIVED WAVEFORM INFORMATION IS SET — S718

S721
INSTRUCTION TO INCREASE NUMBER OF RECEIVING ANTENNAS IS RECEIVED?

NO

YES

INCREASE NUMBER OF RECEIVING ANTENNAS — S722

FIG. 15

WIRELESS COMMUNICATION SYSTEM, RELAY APPARATUS, WIRELESS COMMUNICATION METHOD AND PROGRAM

CROSS-REFERENCE TO RELATED APPLICATIONS

This application is a 371 National Stage of International Application No. PCT/JP2020/048810, filed on Dec. 25, 2020. The entire disclosure of the above application is incorporated herein by reference.

TECHNICAL FIELD

The present invention relates to a wireless communication system, a relay apparatus, a wireless communication method and a program.

BACKGROUND ART

With the development of Internet of Things (IoT) technology, it has been studied to install IoT terminals including various sensors in various places. The IoT terminals may be installed in a place where it is difficult to install a base station, such as a buoy or a ship on the sea or a mountainous area. In view of this, it is considered that data collected by IoT terminals installed in various places is relayed to a base station installed on the ground via a relay apparatus mounted on a low earth orbit satellite. For example, the relay apparatus mounted on the low earth orbit satellite receives data from the IoT terminals by multiple input multiple output (MIMO) by using a plurality of antennas and transmits the received waveform data in each antenna to the base station (see, for example, Non Patent Literature 1). The base station restores signals received by the respective antennas of the relay station by using the received waveform data received from the relay apparatus. The base station performs reception processing such as signal processing and decoding on the restored signals, thereby obtaining the data transmitted from the IoT terminals.

CITATION LIST

Non Patent Literature

Non Patent Literature 1: Itokawa Kiyohiko, Goto Daisuke, Kojima Yasuyoshi, Yamashita Fumihiro, Yoshizawa Kento, Sakamoto Kazumitsu, Fujino Yosuke, Kato Chihaya, and Nakadai Mitsuhiro, "Proposal of 920 MHz Band Satellite IoT Platform Utilizing Low Earth Orbit Satellite MIMO Technology", The Institute of Electronics, Information and Communication Engineers (IEICE), IEICE Communication Society Conference in 2020, B-3-12, September 2020

SUMMARY OF INVENTION

Technical Problem

When the relay apparatus mounted on the low earth orbit satellite transmits, to the ground, waveform data of all antennas that have received data from the IoT terminals, a communication band from the relay apparatus to the base station may be congested due to an enormous amount of the waveform data.

In view of the above circumstances, an object of the present invention is to provide a wireless communication system, relay apparatus, wireless communication method and program capable of reducing an amount of data when the relay apparatus relays received data while moving.

Solution to Problem

One aspect of the present invention is a wireless communication system including: a first communication apparatus; a second communication apparatus; and a mobile relay apparatus, in which: the relay apparatus includes a first signal receiver that receives wireless first signals transmitted from the first communication apparatus through a plurality of receiving antennas, a received waveform recorder that generates waveform data indicating waveforms of the first signals received by the respective plurality of receiving antennas, and a second signal transmitter that transmits second signals indicating the waveform data to the second communication apparatus; the second communication apparatus includes a second signal receiver that receives the second signals transmitted from the relay apparatus, a second signal reception processor that performs reception processing of the second signals received by the second signal receiver to acquire the waveform data, and a first signal reception processor that performs reception processing of the first signals indicated by the waveform data acquired by the second signal reception processor to acquire data set in the first signals by the first communication apparatus; the wireless communication system includes a number-of-antennas determiner that determines the number of receiving antennas according to a relay apparatus position on the basis of information regarding communication quality between the first communication apparatus and the relay apparatus at the relay apparatus position; and the second signal transmitter transmits, to the second communication apparatus, the second signals indicating the waveform data of the first signals received by the respective receiving antennas of the number of receiving antennas determined by the number-of-antennas determiner according to the relay apparatus position among the first signals received by the respective plurality of receiving antennas at the relay apparatus position.

One aspect of the present invention is a mobile relay apparatus included in a wireless communication system including a first communication apparatus, a second communication apparatus, and the relay apparatus, the relay apparatus including: a first signal receiver that receives wireless first signals transmitted from the first communication apparatus through a plurality of receiving antennas; a received waveform recorder that generates waveform data indicating waveforms of the first signals received by the respective plurality of receiving antennas; a number-of-antennas determiner that determines the number of receiving antennas according to a relay apparatus position on the basis of information regarding communication quality between the first communication apparatus and the relay apparatus at the relay apparatus position; and a second signal transmitter that transmits, to the second communication apparatus, second signals indicating the waveform data of the first signals received by the respective receiving antennas of the number of receiving antennas determined by the number-of-antennas determiner according to the relay apparatus position among the first signals received by the respective plurality of receiving antennas at the relay apparatus position.

One aspect of the present invention is a wireless communication method performed by a wireless communication system including a first communication apparatus, a second communication apparatus, and a mobile relay apparatus, the wireless communication method including: a first signal receiving step of causing the relay apparatus to receive wireless first signals transmitted from the first communication apparatus through a plurality of receiving antennas; a received waveform recording step of causing the relay apparatus to generate waveform data indicating waveforms of the first signals received by the plurality of receiving antennas; a number-of-antennas determination step of causing a number-of-antennas determiner to determine the number of receiving antennas according to a relay apparatus position on the basis of information regarding communication quality between the first communication apparatus and the relay apparatus at the relay apparatus position; a second signal transmission step of causing the relay apparatus to transmit, to the second communication apparatus, second signals indicating the waveform data of the first signals received by the respective receiving antennas of the number of receiving antennas determined in the number-of-antennas determination step according to the relay apparatus position among the first signals received by the respective plurality of receiving antennas at the relay apparatus position; a second signal reception step of causing the second communication apparatus to receive the second signals transmitted from the relay apparatus; a second signal receiving processing step of causing the second communication apparatus to perform reception processing of the second signals received in the second signal reception step to acquire the waveform data; and a first signal reception processing step of causing the second communication apparatus to perform reception processing of the first signals indicated by the waveform data acquired in the second signal reception processing step to acquire data set in the first signals by the first communication apparatus.

One aspect of the present invention is a wireless communication method performed by a mobile relay apparatus included in a wireless communication system including a first communication apparatus, a second communication apparatus, and the relay apparatus, the wireless communication method including: a first signal receiving step of receiving wireless first signals transmitted from the first communication apparatus through a plurality of receiving antennas; a received waveform recording step of generating waveform data indicating waveforms of the first signals received by the respective plurality of receiving antennas; a number-of-antennas determination step of determining the number of receiving antennas according to a relay apparatus position on the basis of information regarding communication quality between the first communication apparatus and the relay apparatus at the relay apparatus position; and a second signal transmission step of transmitting, to the second communication apparatus, second signals indicating the waveform data of the first signals received by the respective receiving antennas of the number of receiving antennas determined in the number-of-antennas determination step according to the relay apparatus position among the first signals received by the respective plurality of receiving antennas at the relay apparatus position.

One aspect of the present invention is a program of a mobile relay apparatus in a wireless communication system including a first communication apparatus, a second communication apparatus, and the relay apparatus, the program causing a computer to execute: a number-of-antennas determination step of determining the number of receiving antennas according to a relay apparatus position on the basis of information regarding communication quality between the first communication apparatus and the relay apparatus at the relay apparatus position; and a control step of performing control to transmit, to the second communication apparatus, second signals indicating waveform data of wireless first signals received by respective receiving antennas of the number of receiving antennas determined in the number-of-antennas determination step according to the relay apparatus position among the first signals received by the relay apparatus from the first communication apparatus through a plurality of the receiving antennas at the relay apparatus position.

Advantageous Effects of Invention

According to the present invention, it is possible to reduce an amount of data when a relay apparatus relays received data while moving.

BRIEF DESCRIPTION OF DRAWINGS

FIG. 15 is a flowchart showing processing of a mobile relay station according to the embodiment.

DESCRIPTION OF EMBODIMENTS

Figure 1:
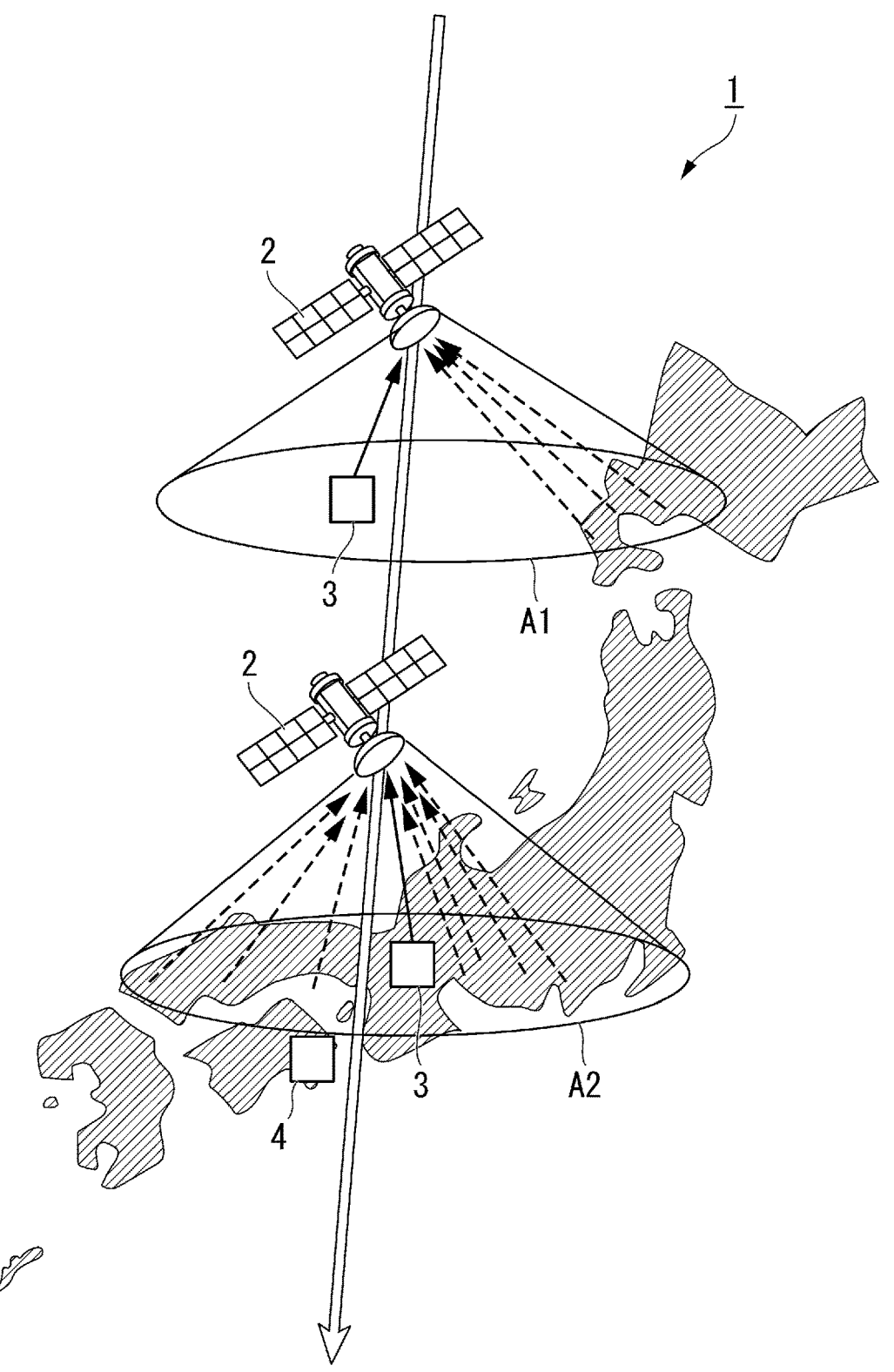
FIG. 1 illustrates a wireless communication system according to an embodiment of the present invention.

Hereinafter, embodiments of the present invention will be described in detail with reference to the drawings.
FIG. 1 illustrates an overview of a wireless communication system 1 according to an embodiment of the present invention. The wireless communication system 1 includes a mobile relay station 2, terminal stations 3, and a base station 4. The numbers of mobile relay stations 2, terminal stations 3, and base stations 4 included in the wireless communication system 1 each are arbitrary, but it is assumed that there is a large number of terminal stations 3.

The mobile relay station 2 is an example of a relay apparatus that is mounted on a moving body and whose communicable area moves with the lapse of time. The mobile relay station 2 of the present embodiment is provided in a low earth orbit (LEO) satellite. The LEO satellite has an altitude of 2000 km or less and moves around the earth once every about 1.5 hours. The terminal stations 3 and the base station 4 are installed on the earth, for example, on the ground or on the sea. The terminal stations 3 are, for example, IoT terminals. A wireless signal from each terminal station 3 to the mobile relay station 2 will be referred to as a terminal uplink signal, a wireless signal from the mobile relay station 2 to the base station 4 will be referred to as a base station downlink signal, and a wireless signal from the base station 4 to the mobile relay station 2 will be referred to as a base station uplink signal.

The terminal station 3 collects data such as environment data detected by a sensor and transmits a terminal uplink signal in which the collected data is set to the mobile relay station 2. The mobile relay station 2 receives the terminal uplink signal transmitted from each of the plurality of terminal stations 3 while moving above the earth. In FIG. 1, the mobile relay station 2 receives terminal uplink signals from the terminal stations 3 installed in an area A1 serving as a communication destination at a certain time. Thereafter, the mobile relay station 2 receives terminal uplink signals from the terminal stations 3 installed in an area A2 serving as a communication destination. The mobile relay station 2 accumulates data received from the terminal stations 3 via the terminal uplink signals and wirelessly transmits the accumulated data to the base station 4 via base station downlink signals at a timing at which the mobile relay station can communicate with the base station 4. The base station 4 acquires the data collected by the terminal stations 3 from the received base station downlink signals.

The mobile relay station 2 includes antennas used for wireless communication with the terminal stations 3 and antennas used for wireless communication with the base station 4. Therefore, the mobile relay station 2 can perform wireless communication with the terminal stations 3 and wireless communication with the base station 4 in parallel. Hereinafter, the antennas through which the mobile relay station 2 receives terminal uplink signals transmitted from the terminal stations 3 will also be referred to as receiving antennas, and the antennas through which the mobile relay station 2 transmits base station downlink signals to the base station 4 will also be referred to as transmission antennas.

The mobile relay station may be, for example, a relay station mounted on an unmanned aerial vehicle such as a geosynchronous satellite, drone, or high altitude platform station (HAPS). However, a relay station mounted on a geosynchronous satellite has a wide coverage area (footprint) on the ground, but has an extremely small link budget with respect to IoT terminals installed on the ground because its altitude is high. Meanwhile, a relay station mounted on a drone or HAPS has a high link budget, but has a narrow coverage area. Further, the drone needs a battery, and the HAPS needs a solar panel. In the present embodiment, the mobile relay station 2 is mounted on the LEO satellite. Thus, the link budget falls within a limit, and, in addition, the LEO satellite has no air resistance and has low fuel consumption because the LEO satellite moves around the outside of the atmosphere. Further, the footprint is large, as compared with a case where the relay station is mounted on the drone or HAPS.

However, the mobile relay station 2 mounted on the LEO satellite performs communication while moving at a high speed, and thus a time during which the individual terminal stations 3 or the base station 4 can communicate with the mobile relay station 2 is limited. Specifically, seen from the ground, the mobile relay station 2 passes through the sky in about several minutes. Therefore, the mobile relay station 2 mounted on the LEO satellite has a smaller link budget than the relay station mounted on the drone or HAPS. Further, wireless communication methods having various specifications are used in the terminal stations 3. Therefore, the mobile relay station 2 receives terminal uplink signals from the terminal stations 3 in coverage at a moving current position through the plurality of receiving antennas and stores waveform data obtained by sampling waveforms of the terminal uplink signals received by the respective receiving antennas. For example, multiple input multiple output (MIMO) is used for the reception using the plurality of receiving antennas. Communication quality can be improved by a diversity effect and beamforming effect of the communication using the plurality of receiving antennas. Hereinafter, waveform data obtained by sampling a waveform of a terminal uplink signal received by a certain receiving antenna will also be referred to as waveform data of the receiving antenna.

The mobile relay station 2 wirelessly transmits base station downlink signals in which the stored waveform data is set to the base station 4 at a timing at which the base station 4 exists in the coverage. The base station 4 obtains the waveform data by demodulating the base station downlink signals received from the mobile relay station 2. The base station 4 performs signal processing and decoding on the terminal uplink signals represented by the waveform data, thereby obtaining terminal transmission data that is the data transmitted by the terminal stations 3.

When the mobile relay station 2 transmits waveform data of terminal uplink signals of all the receiving antennas used for wireless communication with the terminal stations 3 to the base station 4 on the ground, an amount of data is enormous. Therefore, a downlink communication band between the mobile relay station 2 and the base station 4 may be congested. Further, power consumption of the mobile relay station 2 may be increased. Therefore, in the present embodiment, in a case where the communication quality between the mobile relay station 2 and the terminal stations 3 is assumed to be satisfactory, the mobile relay station 2 transmits waveform data of some of the receiving antennas to the base station 4. For example, the mobile relay station 2 transmits waveform data of receiving antennas of a smaller number of receiving antennas to the base station 4 as the communication quality is assumed to be satisfactory.

For example, it is assumed that the communication quality is satisfactory as an angle of elevation between each terminal station 3 and the mobile relay station 2 is larger (is closer to 90 degrees). The terminal stations 3 do not move or move infrequently, and thus the angle of elevation between each terminal station 3 and the mobile relay station 2 is determined based on a position of the mobile relay station 2. Further, for example, it is assumed that the communication quality is satisfactory as a population density in an area where the terminal stations 3 are installed is lower. As illustrated in FIG. 1, there are few interference waves indicated by broken line arrows in the area A1 having a low population density. Thus, the communication quality of terminal uplink signals from the terminal stations 3 installed in the area A1 is assumed to be high. Meanwhile, there are many interference waves indicated by broken line arrows in the area A2 having a high population density. Therefore, the communication quality of terminal uplink signals from the terminal stations 3 installed in the area A2 is assumed to be lower than the communication quality of the terminal uplink signals from the terminal stations 3 installed in the area A1.

The mobile relay station 2 moves around the earth and passes through the same path many times. The base station 4 determines how many pieces of waveform data of receiving antennas is necessary for each area on the basis of a decoding result of waveform data obtained when the mobile relay station 2 has previously moved on the same path. The communication quality is higher as a normally decoding rate is higher, and thus the number of receiving antennas can be reduced. The base station 4 notifies the mobile relay station 2 of the number of receiving antennas determined for each area.

Hereinafter, detailed embodiments of the wireless communication system will be described.

First Embodiment

In a first embodiment, the number of receiving antennas is determined based on an angle of elevation between a mobile relay station and a predetermined position in an area on the earth with which the mobile relay station communicates. The predetermined position is, for example, the center of the area.

Figure 2:
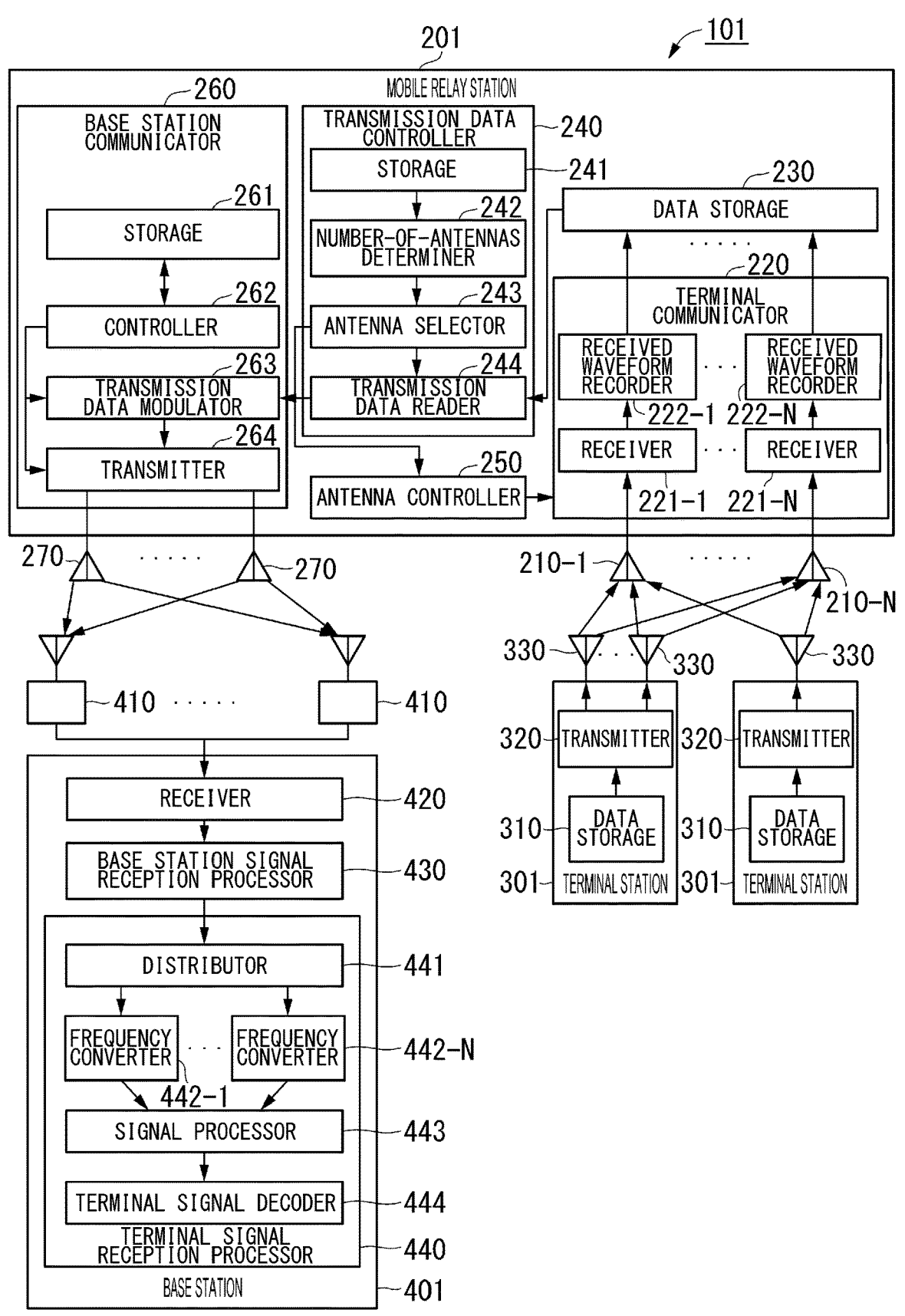
FIG. 2 is a configuration diagram of a wireless communication system according to a first embodiment.

FIG. 2 is a configuration diagram of a wireless communication system 101 according to the first embodiment. The wireless communication system 101 includes a mobile relay station 201, terminal stations 301, and a base station 401. The mobile relay station 201 is used as the mobile relay station 2 in FIG. 1, the terminal stations 301 are used as the terminal stations 3 in FIG. 1, and the base station 401 is used as the base station 4 in FIG. 1.

A satellite reception beam to be formed by post-processing in the base station 401 can be sharper as a receiving array antenna surface of the mobile relay station 201 faces in a direction closer to a front direction. In other words, a separation distance on the ground necessary for separating a desired signal and an interference signal is reduced. Therefore, in a case where it is assumed that the mobile relay station 201 causes the receiving array antenna surface to face in a central direction of the earth (a direction toward the center of the earth), it is easy to separate terminal uplink signals received by the mobile relay station 201 in a case where the angle of elevation between each terminal station 301 and the mobile relay station 201 is large. Accordingly, in a case where the angle of elevation is large, the mobile relay station 201 transmits waveform data of terminal uplink signals received by some receiving antennas to the base station 401.

Specifically, in a case where the mobile relay station 201 collects data from the terminal stations 301 in a specified area at a certain time, an angle of elevation between a center position of the area and the mobile relay station 201 at the time is calculated. The mobile relay station 201 substitutes a value of the calculated angle of elevation into a relational expression for calculating the number of receiving antennas by using the angle of elevation as a parameter, thereby calculating the number of receiving antennas. The mobile relay station 201 transmits waveform data of receiving antennas of the calculated number of receiving antennas to the base station 401 via base station downlink signals. In the first embodiment, there will be described an example where the mobile relay station 201 relays base station downlink signals to the base station 401 through a plurality of transmission antennas by MIMO.

The mobile relay station 201 includes N (N is an integer of 2 or more) antennas 210, a terminal communicator 220, a data storage 230, a transmission data controller 240, an antenna controller 250, a base station communicator 260, and M (M is an integer of 2 or more) antennas 270.

The antennas 210 are receiving antennas that receive terminal uplink signals transmitted from the terminal stations 301. The N antennas 210 will be referred to as antennas 210-1 to 210-N.

The terminal communicator 220 includes N receivers 221 and N received waveform recorders 222. The N receivers 221 will be referred to as receivers 221-1 to 221-N, and the N received waveform recorders 222 will be referred to as received waveform recorders 222-1 to 222-N.

A receiver 221-$n$ (n is an integer of 1 or more but N or less) receives a terminal uplink signal through an antenna 210-$n$. Reception processing by the receiver 221-$n$ may include amplification using a low noise amplifier (LNA) and filtering of a frequency band using a band pass filter (BPF). A received waveform recorder 222-$n$ samples a received waveform of the terminal uplink signal received by the receiver 221-$n$ in the form of a radio frequency (RF) signal as it is and generates waveform data indicating a value obtained by the sampling. The received waveform recorder 222-$n$ writes, to the data storage 230, received waveform information in which antenna identification information of the antenna 210-$n$, a reception time of the terminal uplink signal in the antenna 210-$n$, and the generated waveform data are set. The antenna identification information is information for specifying each antenna 210.

The data storage 230 stores the received waveform information generated by the received waveform recorders 222.

The transmission data controller 240 includes a storage 241, a number-of-antennas determiner 242, an antenna selector 243, and a transmission data reader 244. The storage 241 stores orbit information and communication area information. The orbit information is information from which a position, speed, moving direction, and the like of the LEO satellite provided with the mobile relay station at an arbitrary time can be obtained. The communication area information is information from which information regarding a position of a communication area at each time can be acquired. For example, the communication area information is information in which a period of time indicated by a start time and an end time and a position of the communication area in the period of time are associated with each other. The communication area is an area on the earth with which the mobile relay station 201 communicates. The mobile relay station 201 receives terminal uplink signals from the terminal stations 301 installed in the communication area. The communication area is calculated in advance on the basis of the orbit information of the LEO satellite. In other words, the communication area is determined based on a position of the mobile relay station 201.

The number-of-antennas determiner 242 calculates an angle of elevation between a center position of the communication area and the LEO satellite by using the position of the LEO satellite and information regarding the position of the communication area at each time. The number-of-antennas determiner 242 acquires the position of the LEO satellite at each time on the basis of the orbit information stored in the storage 241. The number-of-antennas determiner 242 further acquires the information regarding the position of the communication area at each time from the area information stored in the storage 241. The number-of-antennas determiner 242 substitutes a value of the calculated angle of elevation as a parameter value into the relational expression for calculating the number of receiving antennas by using the angle of elevation as a parameter, thereby calculating the number of receiving antennas. The relational expression is defined in advance. Alternatively, relational data in which a range of angles of elevation and the number of receiving antennas are associated with each other may be stored in the storage 241, and the number-of-antennas determiner 242 may read the number of receiving antennas corresponding to the value of the calculated angle of elevation from the relational data. The number of receiving antennas is smaller as the angle of elevation is closer to 90 degrees.

The antenna selector 243 selects the antennas 210 of the number of receiving antennas determined by the number-of-antennas determiner 242 from among the N antennas 210. Hereinafter, the selected antennas 210 will also be referred to as selected receiving antennas. The antenna selector 243 selects the antennas 210 of the number of receiving antennas so that a region formed by the selected receiving antennas is as wide as possible and a density of the selected receiving antennas in the region is close to uniform. The storage 241 may store in advance antenna selection information in which the number of receiving antennas and antenna identification information of the antennas 210 to be selected as the selected receiving antennas are associated with each other. The antenna selector 243 reads the antenna identification information corresponding to the number of receiving antennas from the antenna selection information and sets the antennas 210 specified based on the read antenna identification information as the selected receiving antennas.

The transmission data reader 244 reads, from the received waveform information at each time stored in the data storage 230, the received waveform information in which the antenna identification information of the selected receiving antennas at the time is set. Hereinafter, the read received waveform information will be referred to as selected received waveform information. The transmission data reader 244 outputs the selected received waveform information to the base station communicator 260.

In a case where the selected receiving antennas at a current time are already determined, the antenna controller 250 stops reception through the antennas 210 other than the selected receiving antennas. The antennas 210 are passive elements and thus do not need a power supply. Therefore, the antenna controller 250 operates the receiver 221-$n$ and the received waveform recorder 222-$n$ corresponding to the antenna 210-$n$ serving as the selected receiving antenna and stops operation of the receiver 221-$n$ and the received waveform recorder 222-$n$ corresponding to the antenna 210-$n$ other than the selected receiving antenna. This makes it possible to reduce power consumption of the terminal communicator 220. Note that the mobile relay station 201 may not include the antenna controller 250.

The base station communicator 260 transmits base station downlink signals to the base station 401 by MIMO. The base station communicator 260 includes a storage 261, a controller 262, a transmission data modulator 263, and a transmitter 264. The storage 261 stores a transmission start timing calculated in advance on the basis of the orbit information of the LEO satellite provided with the mobile relay station and a position of the base station 401. The storage 261 further stores in advance a weight for each transmission time of a base station downlink signal to be transmitted from each antenna 270. The weight for each transmission time is calculated on the basis of the orbit information of the LEO satellite and a position of each antenna station 410 included in the base station 401. The base station communicator 260 may use a certain weight regardless of the transmission time.

The controller 262 controls the transmission data modulator 263 and the transmitter 264 to transmit the base station downlink signals to the base station 401 at the transmission start timing stored in the storage 261. The controller 262 further issues an instruction on the weight for each transmission time read from the storage 261 to the transmitter 264. The transmission data modulator 263 sets the selected received waveform information received from the transmission data reader 244 as transmission data. The transmission data modulator 263 converts the transmission data into parallel signals and then modulates the parallel signals.

The transmitter 264 weights the modulated parallel signals with the weight issued by the controller 262 and generates base station downlink signals to be transmitted from the respective antennas 270. Although not illustrated, the transmitter 264 includes a power amplifier corresponding to each antenna 270. The transmitter 264 amplifies a base station downlink signal to be transmitted from a certain antenna 270 by using a power amplifier corresponding to the antenna 270 and outputs the base station downlink signal to the antenna 270. Thus, the base station downlink signals are transmitted from the M antennas 270 by MIMO. Note that the base station communicator 260 may not use the weight to transmit base station downlink signals, and the weight may be used in the base station 401 to receive base station downlink signals.

Each antenna 270 operates as a transmission antenna that wirelessly transmits a base station downlink signal. The antenna 270 may also receive a base station uplink signal wirelessly transmitted from the base station 401.

Each terminal station 301 is an IoT terminal installed on the ground (IoT terminal on the ground). The terminal station 301 includes a data storage 310, a transmitter 320, and one or a plurality of antennas 330. The data storage 310 stores sensor data and the like. The transmitter 320 reads the sensor data from the data storage 310 as terminal transmission data and wirelessly transmits a terminal uplink signal in which the read terminal transmission data is set from the antenna 330. The transmitter 320 transmits the signal by, for example, low power wide area (LPWA). Examples of LPWA include LoRaWAN (registered trademark), Sigfox (registered trademark), Long Term Evolution for Machines (LTE-M), and narrowband (NB)-IoT, and an arbitrary wireless communication method can be used. The transmitter 320 may perform transmission with another terminal station 301 by time-division multiplexing, orthogonal frequency division multiplexing (OFDM), or the like. The transmitter 320 determines a channel to be used by the terminal station to transmit a terminal uplink signal and a transmission timing by a method determined in advance in a wireless communication method to be used.

The base station 401 includes the plurality of antenna stations 410, a receiver 420, a base station signal reception processor 430, and a terminal signal reception processor 440. Each antenna station 410 is arranged at a position far from another antenna station 410 so as to increase a difference in an angle of arrival of the signal from each of the plurality of antennas 270 of the mobile relay station 201. Each antenna station 410 converts the base station downlink signal received from the mobile relay station 201 into an electric signal and outputs the electric signal to the receiver 420.

The receiver 420 gathers the base station downlink signals received from the plurality of antenna stations 410. The receiver 420 stores a weight for each reception time with respect to the base station downlink signal received by each antenna station 410 on the basis of the orbit information of the LEO satellite and the position of each antenna station 410. The receiver 420 multiplies the base station downlink signal input from each antenna station 410 by the weight corresponding to the reception time of the base station downlink signal and combines the received signals multiplied by the weights. The same weight may be used regardless of the reception time. The base station signal reception processor 430 demodulates and decodes the combined received signals, thereby obtaining the selected received waveform information. The base station signal reception processor 430 outputs the selected received waveform information to the terminal signal reception processor 440.

The terminal signal reception processor 440 performs reception processing of the terminal uplink signals indicated by the selected received waveform information. At this time, the terminal signal reception processor 440 performs the reception processing by the wireless communication method used by the terminal station 301 for transmission, thereby acquiring the terminal transmission data. The terminal signal reception processor 440 includes a distributor 441, N frequency converters 442, a signal processor 443, and a terminal signal decoder 444. The N frequency converters 442 will be referred to as frequency converters 442-1 to 442-N.

The distributor 441 reads waveform data at the same reception time from the selected received waveform information and outputs the read waveform data to the frequency converters 442-1 to 442-N in accordance with the antenna identification information associated with the waveform data. In other words, the distributor 441 outputs the waveform data associated with the antenna identification information of the antenna 210-n to a frequency converter 442-n. In a case where the antenna 210-n is not the selected receiving antenna, no waveform data is output to the frequency converter 442-n. The distributor 441 may output pieces of the waveform data obtained from the selected received waveform information to different frequency converters 442, regardless of the antenna identification information associated with the waveform data. The frequency converters 442 to which the waveform data has been input from the distributor 441 each perform frequency conversion on the received signal indicated by the waveform data from an RF signal to a baseband signal. The frequency conversion is performed by using a quadrature demodulator or the like. The frequency converters 442-1 to 442-N output the received signals subjected to the frequency conversion to the signal processor 443.

The signal processor 443 accepts input of the received signals from the respective frequency converters 442 to which the waveform data has been input among the frequency converters 442-1 to 442-N. The signal processor 443 performs processing such as frame detection (terminal signal detection), Doppler shift compensation, and offline beam control on the input received signals. The frame detection is processing of detecting a section including a terminal transmission signal (terminal transmission frame) from the waveform data. The signal processor 443 specifies the wireless communication method used by each terminal station 301 to transmit the terminal uplink signal on the basis of information peculiar to the wireless communication method included in the received signal indicated by the waveform data and detects the terminal transmission frame in accordance with the specified wireless communication method. The offline beam control is the following processing: the mobile relay station 201 transmits the recorded waveform data to the base station 401 without performing reception beam control, and the base station 401 performs the reception beam control as post-processing. In the reception beam control, the signal processor 443 multiplies the received signals in respective reception systems by a weight for performing amplitude correction and phase correction and then adds and combines the signals so that the signals are intensified and combined. Note that the signal processor 443 may simply add and combine the received signals of the respective reception systems without performing the reception beam control. The signal processor 443 outputs a symbol obtained from the added and combined received signals to the terminal signal decoder 444. The terminal signal decoder 444 decodes the symbol output by the signal processor 443, thereby obtaining the terminal transmission data transmitted from the terminal stations 301. The terminal signal decoder 444 can also use a decoding method having a large calculation load, such as successive interference cancellation (SIC).

An operation of the wireless communication system 101 will be described.

Figure 3:
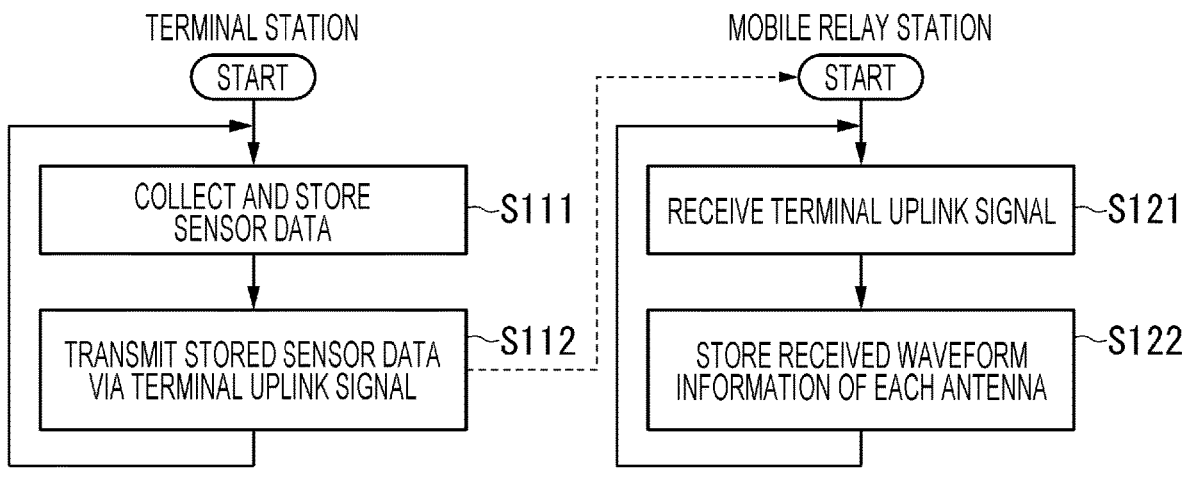
FIG. 3 is a flowchart showing processing of the wireless communication system according to the embodiment.

FIG. 3 is a flowchart showing processing of the wireless communication system 101 in a case where terminal uplink signals are transmitted from the terminal stations 301. Each terminal station 301 acquires data detected by a sensor (not shown) provided outside or inside thereof as necessary and writes the acquired data to the data storage 310 (step S111). The transmitter 320 reads the sensor data from the data storage 310 as terminal transmission data. The transmitter 320 wirelessly transmits a terminal uplink signal in which the terminal transmission data is set from the antenna 330 at a transmission start timing obtained in advance on the basis of the orbit information of the LEO satellite provided with the mobile relay station 201 (step S112). The terminal station 301 repeats the processing from step S111. Note that the terminal station 301 may perform the transmission with another terminal station 301 by time-division multiplexing, OFDM, MIMO, or the like.

The receivers 221-1 to 221-N of the mobile relay station 201 receive the terminal uplink signals transmitted from the terminal stations 301 (step S121). Depending on the wireless communication methods of the terminal stations 301 serving as transmission sources, a terminal uplink signal may be received from only one terminal station 301 by time division at the same frequency, or terminal uplink signals may be simultaneously received from a plurality of terminal stations 301 at the same frequency. The received waveform recorder 222-n writes, to the data storage 230, received waveform information in which waveform data indicating a waveform of a terminal uplink signal received by the receiver 221-n, a reception time, the antenna identification information of the antenna 210-n are associated with one another (step S122). The mobile relay station 201 repeats the processing from step S121.

The receiver 221-n and the received waveform recorder 222-n corresponding to the antenna 210-n that is not a selected receiving antenna at the current time may not perform the processing in steps S121 and S122 under the control of the antenna controller 250.

Figure 4:
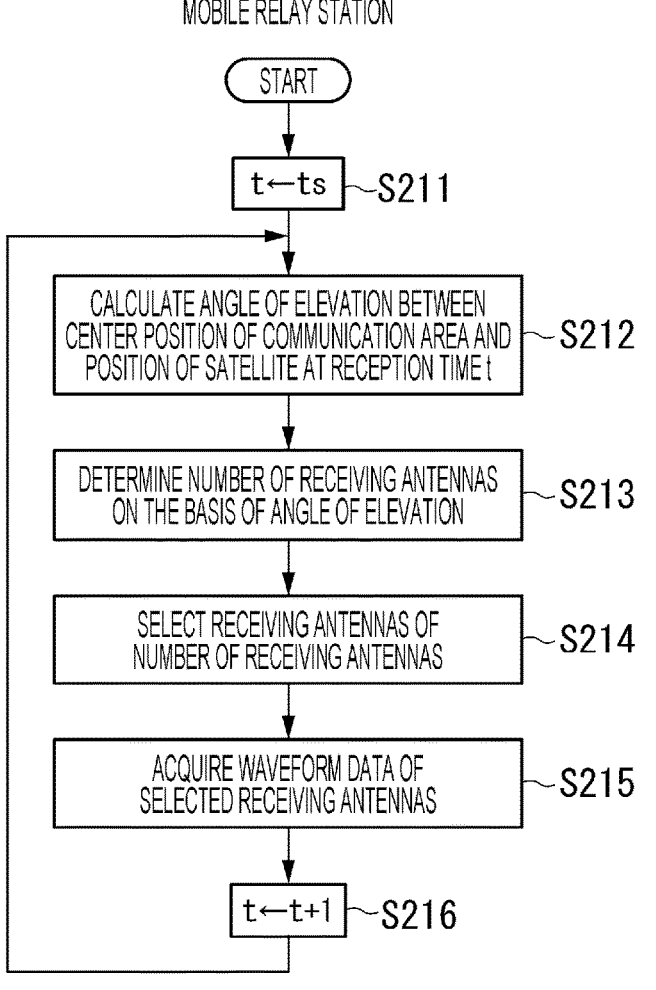
FIG. 4 is a flowchart showing processing of a mobile relay station according to the embodiment.

FIG. 4 is a flowchart showing transmission data control processing by the mobile relay station 201. The number-of-antennas determiner 242 of the mobile relay station 201 sets an initial value ts to a reception time t (step S211). The reception time t represents a time when the mobile relay station 201 receives terminal uplink signals from which waveform data to be transmitted to the base station 401 are obtained. Here, the reception time t is represented by a count value of a unit time elapsed from a reference time. The initial value ts is a time before the current time, that is, a past time. Because the initial value ts is set to the time before the current time, the transmission data controller 240 determines selected receiving antennas after receiving the terminal uplink signals and before transmitting received waveform information via base station downlink signals.

The number-of-antennas determiner 242 acquires the position of the LEO satellite at the reception time t on the basis of the orbit information stored in the storage 241. The number-of-antennas determiner 242 further acquires information regarding the position of the communication area at the reception time t from the communication area information stored in the storage 241. The number-of-antennas determiner 242 calculates an angle of elevation between the center position of the communication area and the position of the LEO satellite provided with the mobile relay station 201 at the reception time t (step S212).

The number-of-antennas determiner 242 substitutes a value of the angle of elevation calculated in step S212 as a parameter value into a relational expression for calculating the number of receiving antennas by using the angle of elevation as a parameter, thereby calculating the number of receiving antennas (step S213). The antenna selector 243 selects the antennas 210 of the number of receiving antennas calculated in step S213 from among the N antennas 210 (step S214). In a case where the number of receiving antennas calculated in step S213 is the same as the number of receiving antennas at a time (t−1), the antenna selector 243 may use selected receiving antennas at the time (t−1).

The transmission data reader 244 reads received waveform information in which antenna identification information of the selected receiving antennas that are the antennas 210 selected in step S214 is set from received waveform information from the reception time t to a reception time (t+1) stored in the data storage 230. The read received waveform information is selected received waveform information from the reception time t to the reception time (t+1). The transmission data reader 244 outputs the selected received waveform information to the transmission data modulator 263 (step S215). The number-of-antennas determiner 242 adds 1 to the reception time t (step S216) and then repeats the processing from step S212.

The transmission data controller 240 may perform the processing in FIG. 4 by setting the current time as the reception time t. In this case, in step S214, the antenna selector 243 further performs processing of notifying the antenna controller 250 of the selected receiving antennas at the reception time t. The antenna controller 250 stops operation of the receiver 221-n and the received waveform recorder 222-n corresponding to the antenna 210-n other than the notified selected receiving antennas.

The transmission data controller 240 may also perform the processing in FIG. 4 by setting a time after the current time as the reception time t. Therefore, the transmission data controller 240 can determine the selected receiving antennas in advance before receiving terminal uplink signals. In this case, in step S211, the number-of-antennas determiner 242 uses the time after the current time as the initial value ts. Then, in step S214, the antenna selector 243 further performs processing of storing antenna selection information indicating the selected receiving antennas at the reception time t in the storage 241. The transmission data controller 240 proceeds to the processing in step S216 after step S214, without performing the processing in step S215. When the received waveform information is transmitted to the base station 401, the transmission data reader 244 reads, from the antenna selection information, information regarding the selected receiving antennas corresponding to the reception time of waveform data to be transmitted. The transmission data reader 244 executes the processing in step S215 by using the reception time of the waveform data to be transmitted as the reception time t. Meanwhile, the antenna controller 250 reads information regarding the selected receiving antennas corresponding to the current time from the antenna selection information stored in the storage 241. The antenna controller 250 stops operation of the receiver 221-n and the received waveform recorder 222-n corresponding to the antenna 210-n other than the read selected receiving antennas.

Figure 5:
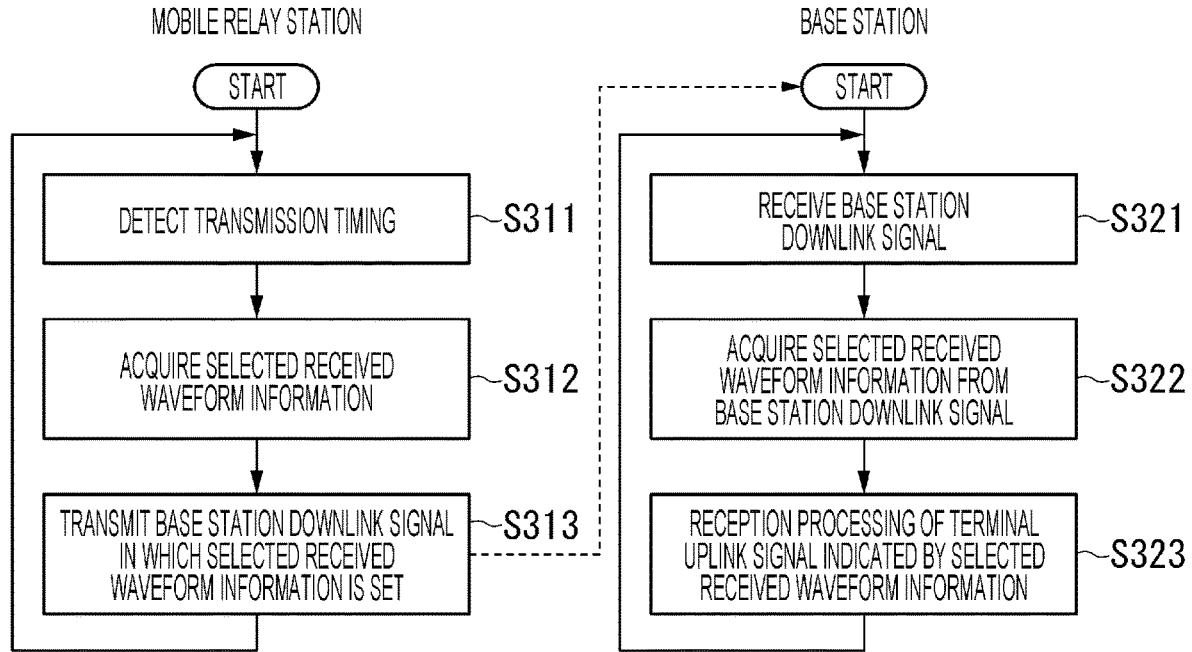
FIG. 5 is a flowchart showing processing of the wireless communication system according to the embodiment.

FIG. 5 is a flowchart showing processing of the wireless communication system 101 in a case where base station downlink signals are transmitted from the mobile relay station 201. When detecting that the current time is a transmission start timing stored in the storage 261, the controller 262 included in the base station communicator 260 of the mobile relay station 201 instructs the transmission data modulator 263 and the transmitter 264 to transmit the received waveform information (step S311).

The transmission data modulator 263 acquires the selected received waveform information output by the transmission data reader 244 in step S215 of FIG. 4 as transmission data (step S312). The selected received waveform information received by the transmission data modulator 263 from the transmission data reader 244 herein is selected received waveform information in which a reception time after a reception time set in selected received waveform information that has been most recently transmitted to the base station 401 is set. The transmission data modulator 263 performs parallel conversion on the acquired transmission data and then modulates the transmission data.

The transmitter 264 weights the transmission data modulated by the transmission data modulator 263 with a weight issued from the controller 262 and generates a base station downlink signal serving as a transmission signal to be transmitted from each antenna 270. The transmitter 264 transmits each generated base station downlink signal from the antenna 270 by MIMO (step S313). The mobile relay station 201 repeats the processing from step S311.

Each antenna station 410 of the base station 401 receives the base station downlink signal from the mobile relay station 201 (step S321). Each antenna station 410 outputs, to the receiver 420, a received signal that is an electric signal into which the received base station downlink signal has been converted. The receiver 420 synchronizes timings of the received signals received from the respective antenna stations 410. The receiver 420 multiplies the received signal received by each antenna station 410 by a weight and adds the received signals. The base station signal reception processor 430 demodulates the added received signals and decodes the demodulated received signals. Thus, the base station signal reception processor 430 obtains the selected received waveform information (step S322). The base station signal reception processor 430 outputs the selected received waveform information to the terminal signal reception processor 440.

The terminal signal reception processor 440 performs reception processing of the terminal uplink signals indicated by the selected received waveform information (step S323).

Specifically, the distributor 441 reads waveform data having the same reception time from the selected received waveform information. The distributor 441 outputs the read waveform data to the frequency converters 442-1 to 442-N in accordance with antenna identification information associated with the waveform data. Among the frequency converters 442-1 to 442-N, the frequency converters 442 to which the waveform data has been input each perform frequency conversion on the received signals represented by the waveform data from RF signals to baseband signals and outputs the received signals subjected to the frequency conversion to the signal processor 443.

The signal processor 443 accepts input of the received signals of the baseband signals from the respective frequency converters 442 to which the waveform data has been input. The signal processor 443 performs frame detection (terminal signal detection), Doppler shift compensation, and offline beam control on each input received signal and adds and combines the received signals. By the addition and combination, the signals transmitted by the terminal stations 301 are emphasized because the signals are correlated, but an influence of randomly added noise is reduced. Therefore, the diversity effect can be obtained for the terminal uplink signal that the mobile relay station 201 simultaneously receives from a single terminal station 301. Further, terminal uplink signals that the mobile relay station 201 simultaneously receives from a plurality of terminal stations 301 correspond to performing MIMO communication. The signal processor 443 outputs a symbol of the added and combined received signals to the terminal signal decoder 444. The terminal signal decoder 444 decodes the symbol input from the signal processor 443, thereby obtaining the terminal transmission data transmitted from the terminal stations 301.

Figure 6:
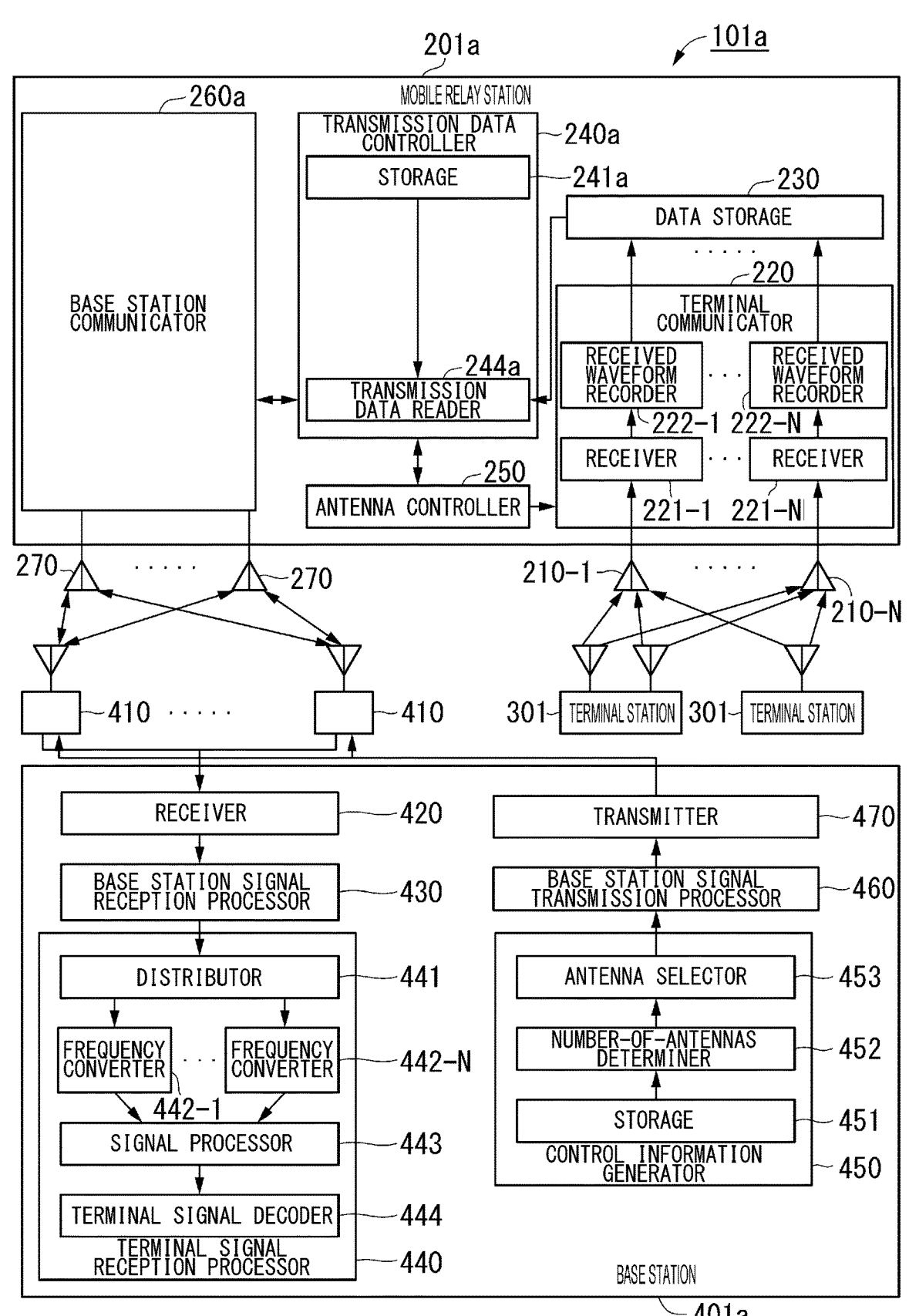
FIG. 6 is a configuration diagram of the wireless communication system according to the embodiment.

As illustrated in FIG. 6, the base station may have some of the functions of the transmission data controller 240 included in the mobile relay station 201. FIG. 6 is a configuration diagram of a wireless communication system 101a. In FIG. 6, the same parts as those of the wireless communication system 101 in FIG. 2 will be denoted by the same reference signs, and description thereof will be omitted. The wireless communication system 101a includes a mobile relay station 201a, the terminal stations 301, and a base station 401a. The mobile relay station 201a is used as the mobile relay station 2 in FIG. 1, and the base station 401a is used as the base station 4 in FIG. 1.

The mobile relay station 201a in FIG. 6 is different from the mobile relay station 201 in FIG. 2 in that the mobile relay station 201a includes a transmission data controller 240a instead of the transmission data controller 240 and includes a base station communicator 260a instead of the base station communicator 260.

The transmission data controller 240a includes a storage 241a and a transmission data reader 244a. The storage 241a stores antenna selection information. The antenna selection information is information indicating selected receiving antennas at each reception time. The transmission data reader 244a reads, from the data storage 230, a piece of received waveform information in which the antenna identification information of the selected receiving antennas at the reception time is set among pieces of reception waveform information in which the same reception time is set. The transmission data reader 244a outputs selected received waveform information that is the read received waveform information to the base station communicator 260a. Note that the transmission data reader 244a reads the selected receiving antennas at the reception time from the antenna selection information stored in the storage 241a.

The base station communicator 260a transmits and receives wireless signals to and from the base station 401a. Details of the base station communicator 260a will be described below with reference to FIG. 7.

The base station 401a in FIG. 6 is different from the base station 401 in FIG. 2 in that the base station 401a further includes a control information generator 450, a base station signal transmission processor 460, and a transmitter 470. Note that an external apparatus connected to the base station 401a may include the control information generator 450.

The control information generator 450 generates antenna selection information of each mobile relay station 201a. The control information generator 450 includes a storage 451, a number-of-antennas determiner 452, and an antenna selector 453.

The storage 451 stores the orbit information of the LEO satellite provided with the mobile relay station 201a and the communication area information for each mobile relay station 201a. The number-of-antennas determiner 452 performs processing similar to that of the number-of-antennas determiner 242 for each mobile relay station 201a. Thus, the number-of-antennas determiner 452 calculates the number of receiving antennas at each reception time for each mobile relay station 201a. The antenna selector 453 performs processing similar to that of the antenna selector 243 for each mobile relay station 201a. Thus, the antenna selector 453 selects, for each mobile relay station 201a, the antennas 210 of the number of receiving antennas determined by the number-of-antennas determiner 452 from among the N antennas 210 included in the mobile relay station 201a.

The base station signal transmission processor 460 converts transmission data into parallel signals to be transmitted from the respective antenna stations 410 and then modulates the parallel signals. The transmitter 470 weights the parallel signals to be transmitted from the respective antenna stations 410 with a transmission weight and generates base station uplink signals to be transmitted from the respective antenna station 410. The transmitter 470 outputs the generated base station uplink signals to the corresponding antenna stations 410. The antenna stations 410 wirelessly transmit the base station uplink signals.

Figure 7:
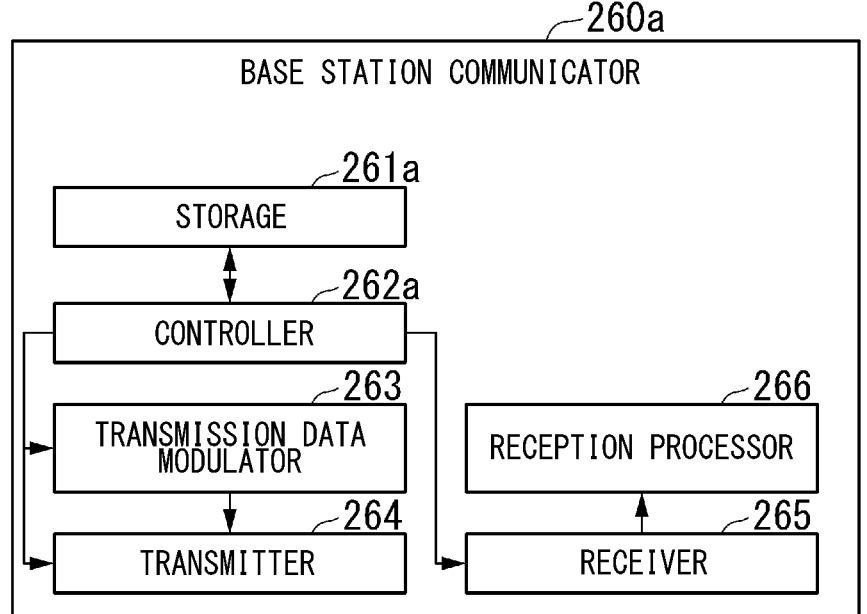
FIG. 7 is a configuration diagram of a base station communicator according to the embodiment.

FIG. 7 is a configuration diagram of the base station communicator 260a included in the mobile relay station 201a. The base station communicator 260a is different from the base station communicator 260 of the mobile relay station 201 in FIG. 2 in that base station communicator 260a includes a storage 261a instead of the storage 261, includes a controller 262a instead of the controller 262, and further includes a receiver 265 and a reception processor 266. The storage 261a stores not only information similar to that of the storage 261 but also, for each reception time, a reception weight to be applied to the base station uplink signal that each antenna 270 has received from the base station 401a serving as a communication destination. The reception weight for each reception time is calculated based on the orbit information of the LEO satellite and the position of each antenna station 410 of the base station 401a serving as the communication destination.

The controller 262a performs processing similar to that of the controller 262. Further, the controller 262a reads the reception weight of each antenna 270 for each reception time from the storage 261a and issues an instruction on the read reception weight to the receiver 265. The receiver 265 receives the base station uplink signal through each antenna 270, multiplies the reception weight issued by the controller 262a by the received signal received by each antenna 270, and then adds and combines the received signals. The reception processor 266 demodulates and decodes the received signals added and combined by the receiver 265, thereby obtaining the transmission data transmitted by the base station 401a.

Figure 8:
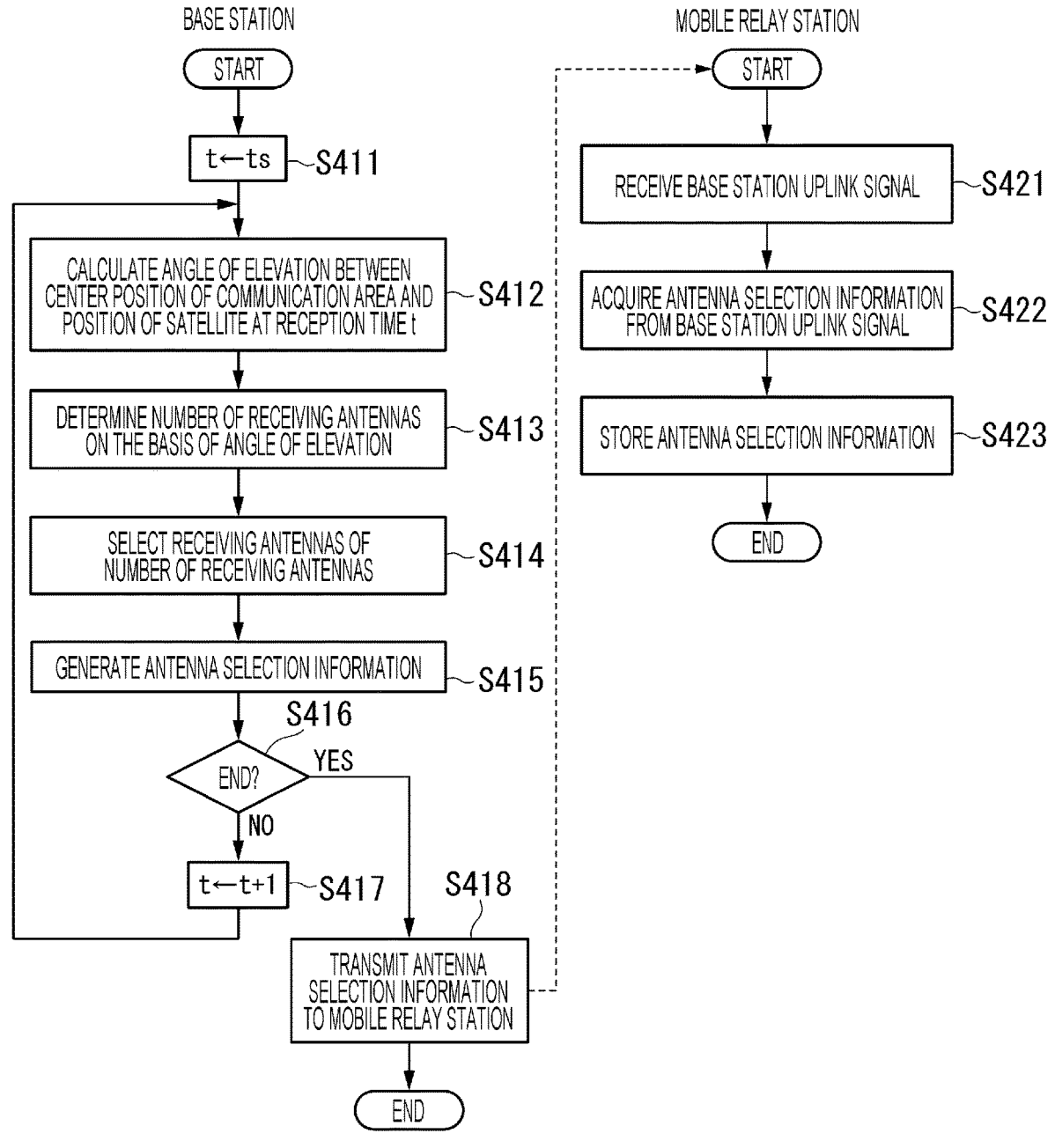
FIG. 8 is a flowchart showing processing of the wireless communication system according to the embodiment.

The wireless communication system 101a operates in a similar manner to that in FIGS. 3 and 5. The wireless communication system 101a also performs processing in FIG. 8 for each mobile relay station 201a. FIG. 8 is a flowchart showing information generation processing by the wireless communication system 101a. The number-of-antennas determiner 452 of the base station 401a sets the initial value ts to the reception time t (step S411). The initial value ts is a time after the current time.

The number-of-antennas determiner 452 performs processing similar to that in step S212 of FIG. 4 by referring to the orbit information and the communication area information stored in the storage 451. Thus, the number-of-antennas determiner 452 calculates an angle of elevation between the center position of the communication area at the reception time t and the position of the LEO satellite provided with the mobile relay station 201a (step S412). The number-of-antennas determiner 452 calculates the number of receiving antennas based on a value of the angle of elevation calculated in step S412 by processing similar to that in step S213 of FIG. 4 (step S413). The antenna selector 453 selects the antennas 210 of the number of receiving antennas calculated in step S413 from among the N antennas 210 of the mobile relay station 201a (step S414). The antenna selector 453 generates antenna selection information associated with the reception time t and antenna identification information of the antennas 210 selected in step S414 (step S415). The antenna identification information is information regarding the selected receiving antennas.

The number-of-antennas determiner 452 determines whether or not a predetermined termination condition is satisfied (step S416). The termination condition can be, for example, a case where the reception time t reaches a predetermined time or a case where loop processing from step S412 to step S417 is performed a predetermined number of times.

When determining that the termination condition is not satisfied (step S416: NO), the number-of-antennas determiner 452 adds 1 to the reception time t (step S417) and repeats the processing from step S412. When the number-of-antennas determiner 452 determines that the termination condition is satisfied (step S416: YES), the antenna selector 453 outputs the generated antenna selection information to the base station signal transmission processor 460.

The base station signal transmission processor 460 sets the antenna selection information input from the antenna selector 453 as transmission data. The base station signal transmission processor 460 converts the transmission data into parallel signals and then modulates the parallel signals. The transmitter 470 weights the modulated parallel signals with the transmission weight and generates base station uplink signals. The transmitter 470 outputs the generated base station uplink signals to the corresponding antenna stations 410. The antenna station 410 wirelessly transmits the base station uplink signals (step S418).

Each antenna 270 of the mobile relay station 201a receives the base station uplink signal (step S421). The controller 262a reads the reception weight of each antenna 270 for each reception time from the storage 261a and issues an instruction on the read reception weight to the receiver 265. The receiver 265 multiplies the base station uplink signal received by each antenna 270 by the reception weight issued by the controller 262a, and then adds and combines the base station uplink signals. The reception processor 266 demodulates and decodes the received signals added and combined by the receiver 265, thereby obtaining the antenna selection information transmitted by the base station 401a (step S422). The reception processor 266 outputs the antenna selection information to the transmission data reader 244a. The transmission data reader 244a stores the antenna selection information in the storage 241a (step S423).

The transmission data controller 240a performs the processing in FIG. 4 except for the following point. That is, instead of the processing in steps S212 to S214, the transmission data reader 244a performs processing of reading, from the antenna selection information stored in the storage 241a, information regarding the selected receiving antennas corresponding to the reception time t of waveform data to be transmitted. Thus, in step S215, the transmission data reader 244a reads the received waveform information in which the antenna identification information of the selected receiving antennas is set from the received waveform information from the reception time t to the reception time (t+1) stored in the data storage 230. The transmission data reader 244a outputs the read received waveform information to the transmission data modulator 263 as selected received waveform information.

Meanwhile, the antenna controller 250 reads information regarding the selected receiving antennas corresponding to the current time from the antenna selection information stored in the storage 241a. The antenna controller 250 stops operation of the receiver 221-n and the received waveform recorder 222-n corresponding to the antenna -n other than the read selected receiving antennas.

The transmission data controller 240a of the mobile relay station 201a in FIG. 6 may include the antenna selector 243, and the control information generator 450 of the base station 401a may not include the antenna selector 453. In this case, the base station 401a does not perform the processing in step S414 of FIG. 8, and, in step S415, the number-of-antennas determiner 452 generates number-of-antennas information in which the reception time t and the number of receiving antennas are associated with each other. Then, in step S418, the number-of-antennas determiner 452 outputs the generated number-of-antennas information to the base station signal transmission processor 460. Thus, the base station 401a wirelessly transmits base station uplink signals in which the number-of-antennas information is set.

In step S422, the base station communicator 260a of the mobile relay station 201a acquires the number-of-antennas information from the base station uplink signals and outputs the number-of-antennas information to the transmission data controller 240a. In step S423, the antenna selector 243 stores the number-of-antennas information in the storage 241a. Then, the transmission data controller 240a performs the processing in FIG. 4 except for the following point. That is, instead of the processing in steps S212 and S213, the transmission data controller 240a causes the antenna selector 243 to perform processing of reading, from the number-of-antennas information stored in the storage 241a, information regarding the number of receiving antennas corresponding to the reception time t of the waveform data to be transmitted.

The mobile relay station 201 in FIG. 2 may include the base station communicator 260a in FIGS. 6 and 7 instead of the base station communicator 260. In this case, the base station 401 in FIG. 2 includes the base station signal transmission processor 460 and the transmitter 470 in FIG.

6. In a case where the orbit information or communication area information stored in the storage 241 of the mobile relay station 201 is updated or in a case where the relational expression or relational data used in the number-of-antennas determiner 242 is updated, the base station 401 may transmit the updated orbit information, communication area information, relational expression, or relational data to the mobile relay station 201. The mobile relay station 201 updates the stored orbit information, communication area information, relational expression, or relational data with the received orbit information, communication area information, relational expression, or relational data.

In the above present embodiment, the mobile relay station 201 and the base station 401 and the mobile relay station 201a and the base station 401a perform communication by MIMO. However, the present invention is not limited thereto. For example, the mobile relay stations 201 and 201a may communicate with the base station through a single antenna 270. Similarly, the base stations 401 and 401a may transmit and receive a signal to and from the mobile relay station through a single antenna instead of the antenna stations 410.

According to the first embodiment, in a case where the angle of elevation from the communication area of the mobile relay station is large and communication quality of uplink signals from the terminal stations is assumed to be satisfactory, it is possible to reduce an amount of waveform data to be transmitted to the base station. This makes it possible to reduce a downlink band from the mobile relay station to the base station. It is further possible to reduce power consumption of the mobile relay station.

Second Embodiment

A wireless communication system of a second embodiment controls the number of receiving antennas of a mobile relay station in accordance with a population density in an area with which the mobile relay station communicates. As an LEO satellite is farther from a large city, an amount of interference from another IoT terminal and the like on the ground serving as an interference source with respect to IoT terminals on the ground communicating with the mobile relay station mounted on the LEO satellite is reduced. In a case where the amount of interference is small, reception quality is satisfactory, and thus the required number of receiving antennas is also small.

An arrangement distribution of IoT terminals on the ground has the same tendency as a population distribution. In other words, IoT terminals on the ground tend to be concentrated in an area where population is dense. Therefore, the wireless communication system of the second embodiment determines the number of receiving antennas on the basis of data of a population density in an area where the mobile relay station collects data at each time and transmits waveform data of the number of receiving antennas from the mobile relay station to a base station. The fact that the arrangement distribution of IoT terminals on the ground has the same tendency as the population distribution is disclosed in, for example, the following reference literature. In the reference literature, an average number of simultaneous communications in each area of LPWA is calculated on the assumption that terminals are used in proportion to a population density.

(Reference Literature) Ministry of Internal Affairs and Communications, Information and Communications Council, "'Technical conditions regarding improvement in 920 MHz band low-power wireless system' among 'Technical conditions necessary for improving low-power wireless system'", pp. 40-44, January 2020

All arrangement places of IoT terminals on the ground are managed in some cases. In this case, information regarding an installation density of the IoT terminals on the ground obtained from information regarding positions of the IoT terminals on the ground may be used instead of the information regarding the population density. Here, an example of using the population density will be described. The second embodiment will be described by focusing on differences from the first embodiment.

Figure 9:
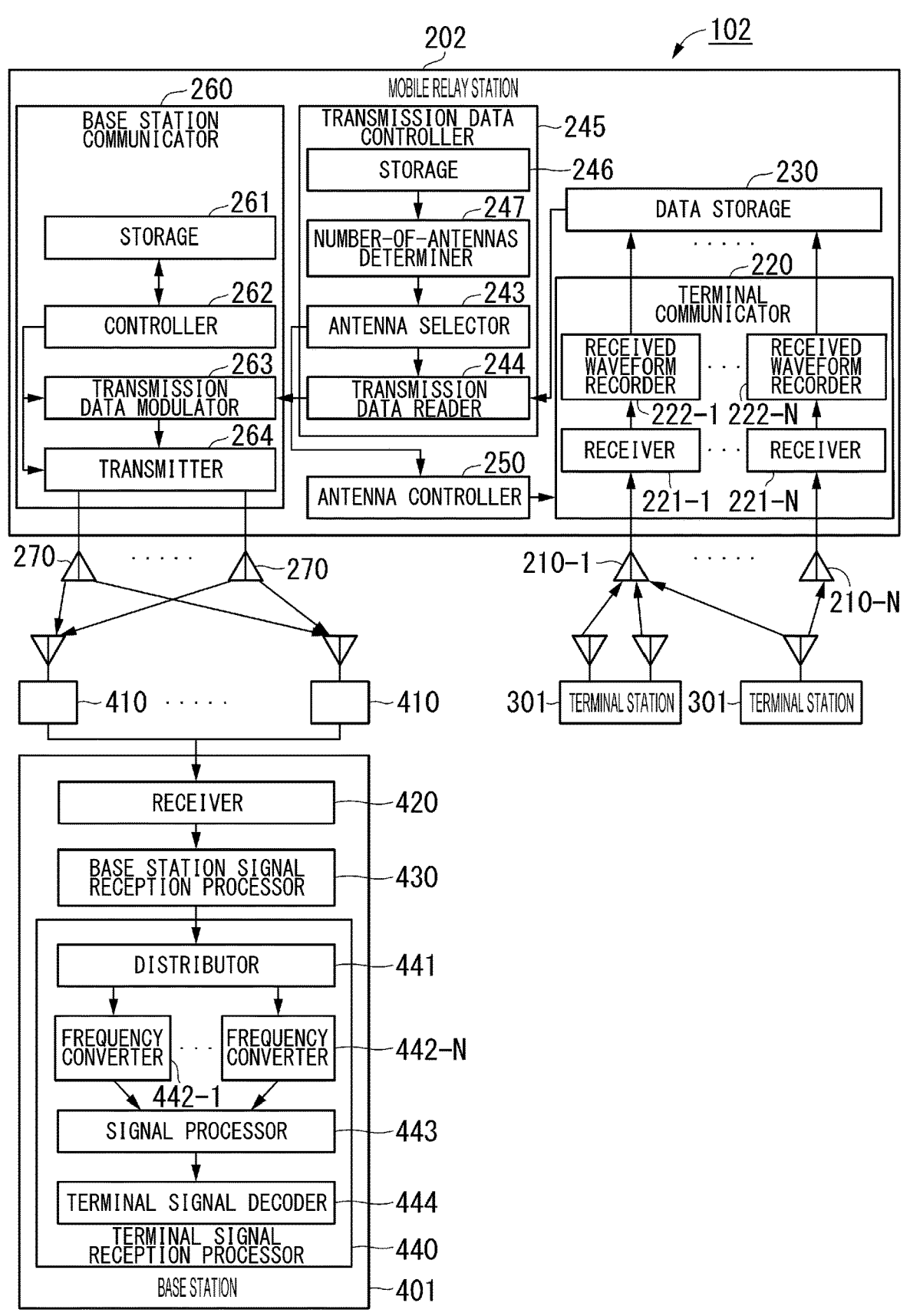
FIG. 9 is a configuration diagram of a wireless communication system according to a second embodiment.

FIG. 9 is a configuration diagram of a wireless communication system 102 according to the second embodiment. In FIG. 9, the same parts as those in the wireless communication system 101 according to the first embodiment in FIG. 2 will be denoted by the same reference signs, and description thereof will be omitted. The wireless communication system 102 includes a mobile relay station 202, the terminal station 301, and the base station 401. The mobile relay station 202 is used as the mobile relay station 2 in FIG. 1.

The mobile relay station 202 is different from the mobile relay station 201 in FIG. 2 in that the mobile relay station 202 includes a transmission data controller 245 instead of the transmission data controller 240. The transmission data controller 245 includes a storage 246, a number-of-antennas determiner 247, the antenna selector 243, and the transmission data reader 244.

The storage 246 stores population density information. The population density information indicates a population density in a communication area at each time. The communication area is determined in advance on the basis of the orbit information of the LEO satellite provided with the mobile relay station 202. The number-of-antennas determiner 247 reads a value of the population density in the communication area at a reception time of a terminal uplink signal from the population density information stored in the storage 246. The number-of-antennas determiner 247 substitutes a value of the acquired population density as a parameter value into a relational expression for calculating the number of receiving antennas by using the population density as a parameter, thereby calculating the number of receiving antennas. The relational expression is defined in advance. Alternatively, relational data in which a range of values of the population density and the number of receiving antennas are associated with each other may be stored in the storage 246. The number-of-antennas determiner 247 reads the number of receiving antennas corresponding to the value of the population density from the relational data.

The wireless communication system 102 performs processing similar to that in FIGS. 3 and 5 of the first embodiment. The mobile relay station 202 performs transmission data control processing in FIG. 10.

Figure 10:
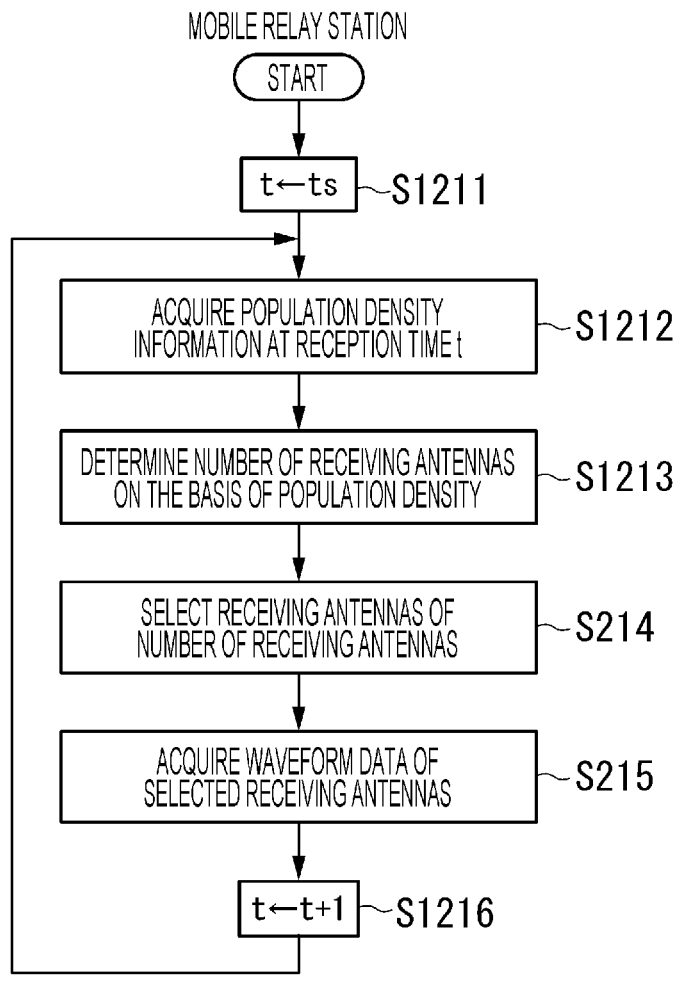
FIG. 10 is a flowchart showing processing of a mobile relay station according to the embodiment.

FIG. 10 is a flowchart showing the transmission data control processing by the mobile relay station 202. In FIG. 10, the same processing as that of the transmission data control processing according to the first embodiment in FIG. 4 will be denoted by the same reference signs, and description thereof will be omitted. The number-of-antennas determiner 247 of the mobile relay station 202 sets the initial value is to the reception time t (step S1211). The reception time t represents a reception time of waveform data to be transmitted to the base station 401. The reception time t is represented by a count value of a unit time elapsed from the reference time. The initial value ts is a time before the current time. Therefore, the transmission data controller 245 determines selected receiving antennas after receiving terminal uplink signals and before transmitting received waveform information via base station downlink signals.

The number-of-antennas determiner 247 acquires the value of the population density at the reception time t from the population density information stored in the storage 246 (step S1212). The number-of-antennas determiner 247 substitutes the value of the population density information acquired in step S1212 as a parameter value into a relational expression for calculating the number of receiving antennas by using the population density as a parameter, thereby calculating the number of receiving antennas (step S1213). The antenna selector 243 performs the processing in step S214 of FIG. 4, and the transmission data reader 244 performs the processing in step S215 of FIG. 4. The number-of-antennas determiner 247 adds 1 to the reception time t (step S1216) and then repeats the processing from step S1212.

The transmission data controller 245 may perform the processing in FIG. 10 by setting the current time as the reception time t. In this case, in step S214, the antenna selector 243 notifies the antenna controller 250 of the selected receiving antennas at the reception time t. The antenna controller 250 stops operation of the receiver 221-$n$ and the received waveform recorder 222-$n$ corresponding to the antenna 210-$n$ other than the notified selected receiving antennas.

The transmission data controller 245 may perform the processing in FIG. 10 by setting a time after the current time as the reception time t. Therefore, the transmission data controller 245 can determine the selected receiving antennas in advance before receiving terminal uplink signals. In this case, in step S1211, the number-of-antennas determiner 247 uses the time after the current time as the initial value ts. Then, in step S214, the antenna selector 243 further performs processing of storing antenna selection information indicating the selected receiving antennas at the reception time t in the storage 246. The transmission data controller 245 proceeds to the processing in step S1216 after step S214, without performing the processing in step S215. When the received waveform information is transmitted to the base station 401, the transmission data reader 244 reads, from the antenna selection information, information regarding the selected receiving antennas corresponding to the reception time of waveform data to be transmitted. The transmission data reader 244 executes the processing in step S215 by using the reception time of the waveform data to be transmitted as the reception time t.

Figure 11:
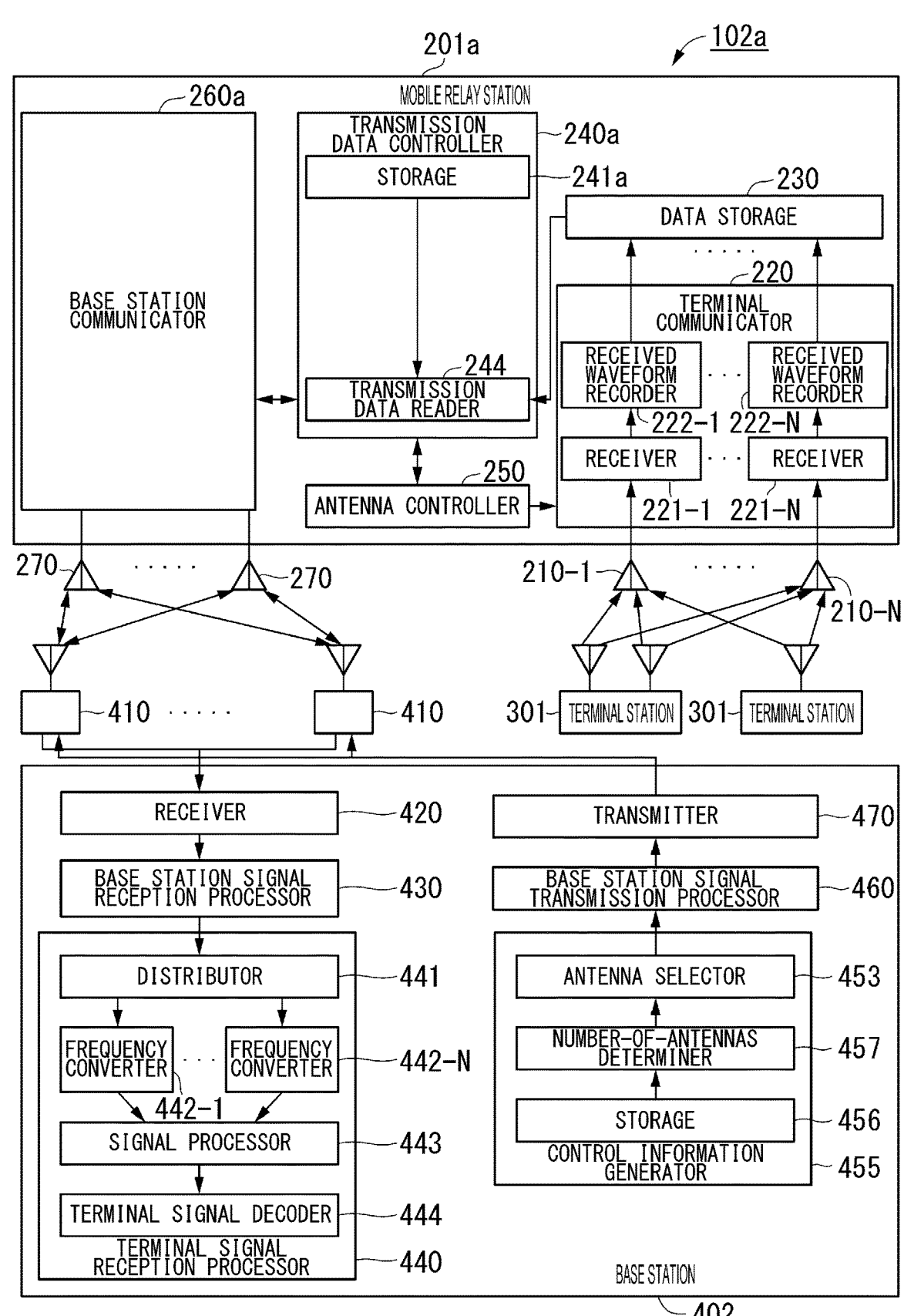
FIG. 11 is a configuration diagram of the wireless communication system according to the embodiment.

As illustrated in FIG. 11, the base station may have some of the functions of the transmission data controller 245 included in the mobile relay station 202. FIG. 11 is a configuration diagram of a wireless communication system 102a. In FIG. 11, the same parts as those of the wireless communication system 101a in FIG. 6 and those of the wireless communication system 102 in FIG. 9 will be denoted by the same reference signs, and description thereof will be omitted. The wireless communication system 102a includes a mobile relay station 201a, the terminal station 301, and a base station 402. The base station 402 is used as the base station 4 in FIG. 1.

The base station 402 in FIG. 11 is different from the base station 401a in FIG. 6 in that the base station 402 includes a control information generator 455 instead of the control information generator 450. The control information generator 455 includes a storage 456, a number-of-antennas determiner 457, and the antenna selector 453.

The storage 456 stores population density information for each mobile relay station 201a. The number-of-antennas determiner 457 performs processing similar to that of the number-of-antennas determiner 247 for each mobile relay station 201a. Thus, the number-of-antennas determiner 457 calculates the number of receiving antennas at each reception time for each mobile relay station 201a.

Figure 12:
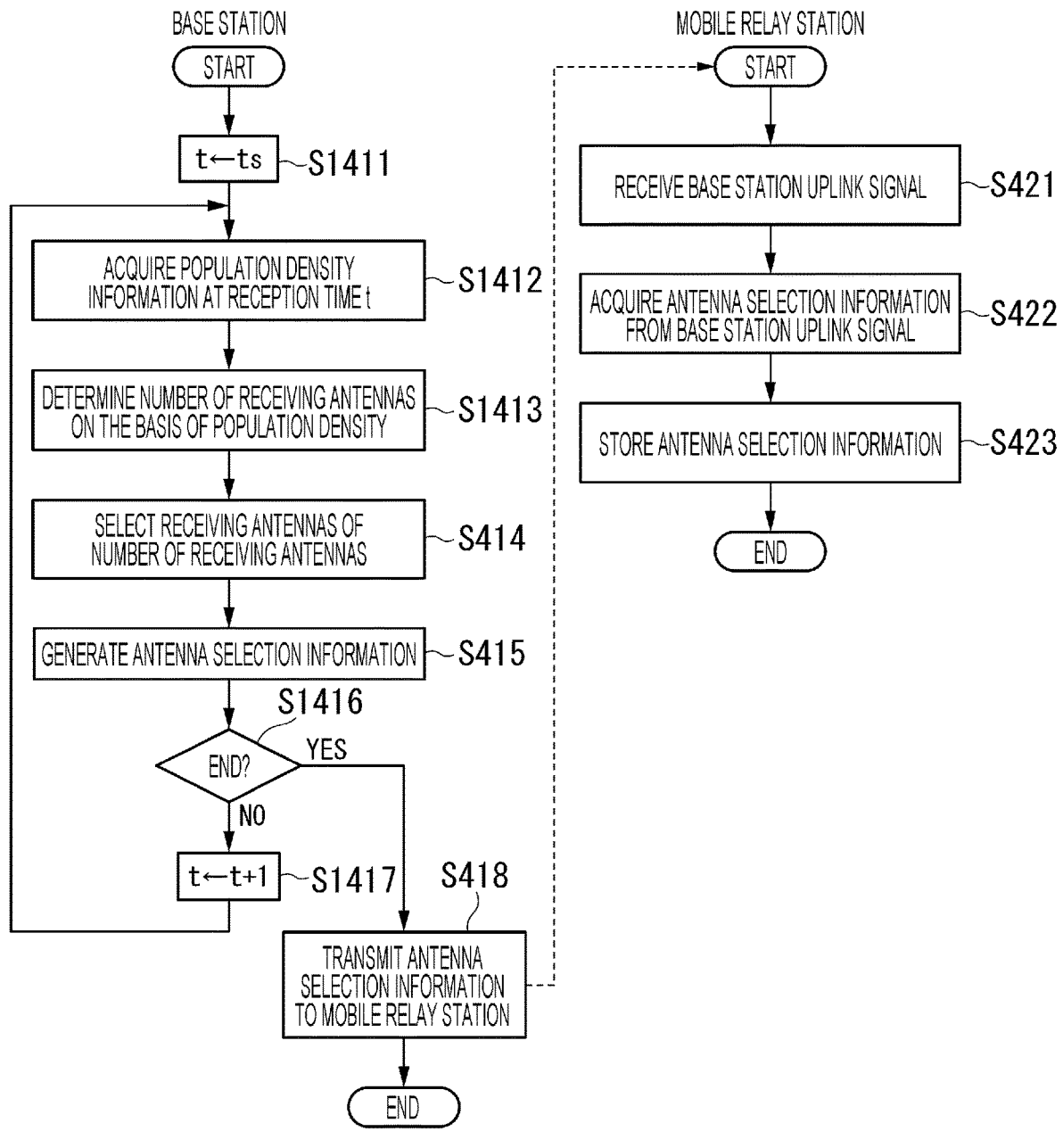
FIG. 12 is a flowchart showing processing of the wireless communication system according to the embodiment.

The wireless communication system 102a operates in a similar manner to that in FIGS. 3 and 5. The wireless communication system 102a also performs processing in FIG. 12 for each mobile relay station 201a. FIG. 12 is a flowchart showing information generation processing by the wireless communication system 102a. In FIG. 12, the same processing as that of the information generation processing according to the first embodiment in FIG. 8 will be denoted by the same reference signs, and description thereof will be omitted.

The number-of-antennas determiner 457 of the base station 402 sets the initial value ts as the reception time t (step S1411). The reception time ts is a time after the current time. The number-of-antennas determiner 457 acquires the value of the population density at the reception time t from the population density information stored in the storage 456 (step S1412). The number-of-antennas determiner 457 calculates the number of receiving antennas on the basis of the population density by processing similar to that in step S1213 of FIG. 10 (step S1413).

The antenna selector 453 performs the processing in steps S414 and S415 of FIG. 8. The number-of-antennas determiner 457 determines whether or not a predetermined termination condition is satisfied (step S1416). The termination condition can be similar to that in step S416 of FIG. 8. When determining that the termination condition is not satisfied (step S1416: NO), the number-of-antennas determiner 457 adds 1 to the reception time t (step S1417) and repeats the processing from step S1412. When the number-of-antennas determiner 457 determines that the termination condition is satisfied (step S1416: YES), the base station 402 performs processing similar to that in step S418 of FIG. 8 and transmits the antenna selection information to the mobile relay station 201a. The mobile relay station 201a performs the processing in steps S421 to S423 of FIG. 8.

The transmission data controller 240a of the mobile relay station 201a in FIG. 11 may include the antenna selector 243, and the control information generator 455 of the base station 402 may not include the antenna selector 453. In this case, the base station 402 does not perform the processing in step S414 of FIG. 12, and, in step S415, the number-of-antennas determiner 457 generates number-of-antennas information in which the reception time t and the number of receiving antennas are associated with each other. Then, in step S418, the number-of-antennas determiner 457 outputs the generated number-of-antennas information to the base station signal transmission processor 460. Thus, the base station 402 wirelessly transmits base station uplink signals in which the number-of-antennas information is set.

The mobile relay station 202 in FIG. 9 may include the base station communicator 260a in FIGS. 6 and 7 instead of the base station communicator 260, and the base station 401 in FIG. 9 may include the base station signal transmission processor 460 and the transmitter 470 in FIG. 6. In a case where the population density information stored in the storage 246 of the mobile relay station 202 is updated or in a case where the relational expression or relational data used in the number-of-antennas determiner 247 is updated, the base station 401 may transmit the updated population density information, relational expression, or relational data to the mobile relay station 202. The mobile relay station 202 updates the stored population density information, relational expression, or relational data with the received population density information, relational expression, or relational data.

The wireless communication systems 102 and 102*a* may use information regarding the density of IoT terminals on the ground instead of the population density information. It is also possible to use a density of the terminal stations 301 as the density of IoT terminals on the ground. Further, the mobile relay stations 202 and 201*a* may communicate with the base station through a single antenna 270. Similarly, the base stations 401 and 402 may transmit and receive a signal to and from the mobile relay station through a single antenna instead of the antenna stations 410.

Third Embodiment

A wireless communication system of a third embodiment determines the number of receiving antennas necessary for each communication area on the basis of the past communication success rate in the same path. That is, the wireless communication system determines the required number of receiving antennas on the basis of a decoding success rate of terminal uplink signals received when the mobile relay station has previously passed through each communication area and the number of receiving antennas at the time of decoding. The communication success rate such as the decoding success rate is an example of signal quality of terminal uplink signals obtained when the base station performs reception processing of the terminal uplink signals. A stage of collecting data for determining the required number of receiving antennas, analyzing the collected data, and determining the required number of antennas will be referred to as an analysis phase, and a stage of performing communication by using the required number of antennas determined in the analysis phase will be referred to as a normal operation phase. The analysis phase continues for a time during which the mobile relay station passes through the same path a plurality of times. The third embodiment will be described by focusing on differences from the first and second embodiments.

Figure 13:
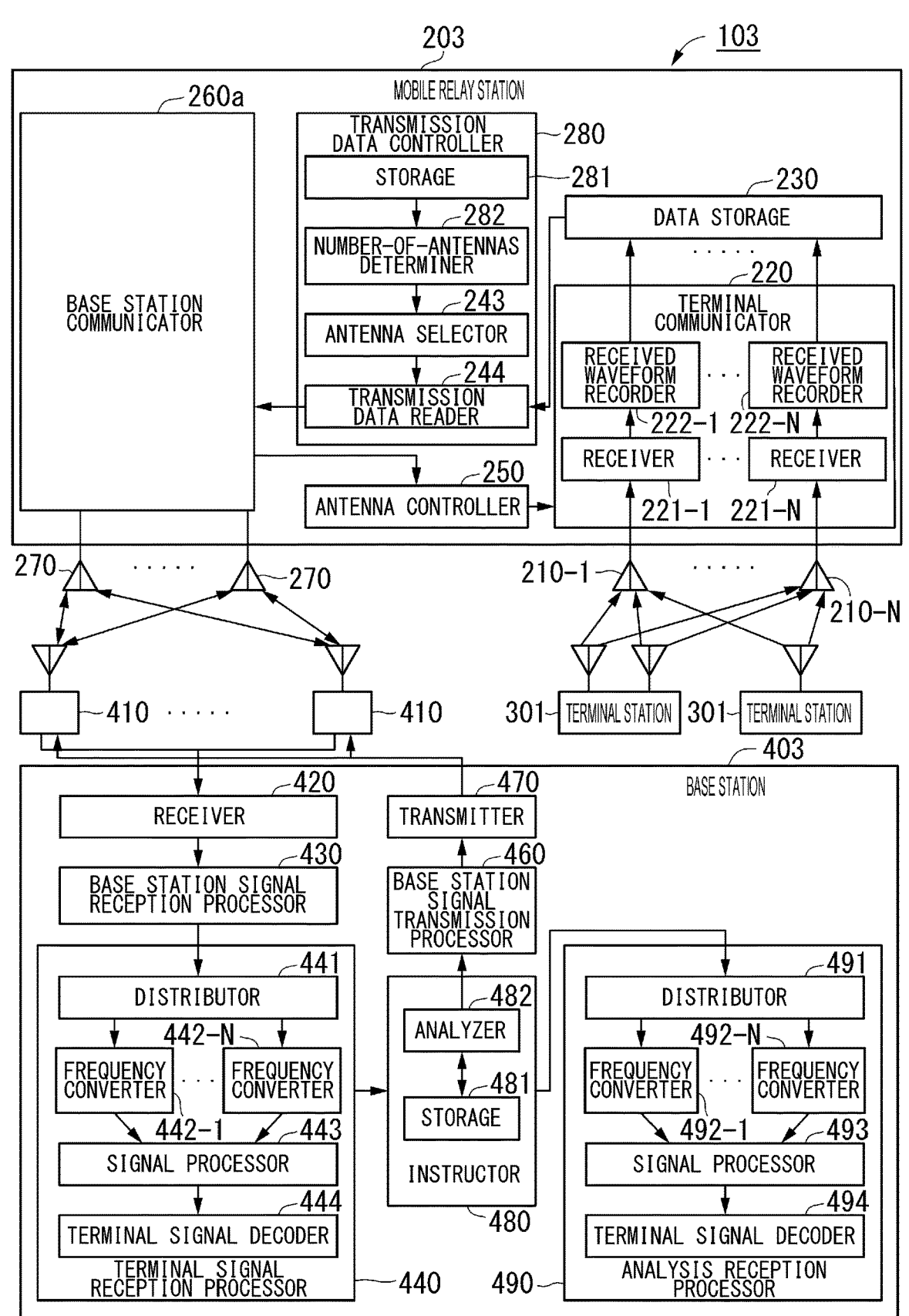
FIG. 13 is a configuration diagram of a wireless communication system according to a third embodiment.

FIG. 13 is a configuration diagram of a wireless communication system 103 according to the third embodiment. In FIG. 13, the same parts as those of the wireless communication system 101 according to the first embodiment in FIG. 2 and those of the wireless communication system 101*a* according to the first embodiment in FIG. 6 will be denoted by the same reference signs, and description thereof will be omitted. The wireless communication system 103 includes a mobile relay station 203, the terminal station 301, and a base station 403. The mobile relay station 203 is used as the mobile relay station 2 in FIG. 1, and the base station 403 is used as the base station 4 in FIG. 1.

The mobile relay station 203 is different from the mobile relay station 201 in FIG. 2 in that the mobile relay station 203 includes a transmission data controller 280 instead of the transmission data controller 240 and includes the base station communicator 260*a* instead of the base station communicator 260. The transmission data controller 280 includes a storage 281, a number-of-antennas determiner 282, the antenna selector 243, and the transmission data reader 244.

The storage 281 stores communication area information and area-specific number-of-antennas information. The area-specific number-of-antennas information is information in which a communication area and the number of receiving antennas are associated with each other. The number-of-antennas determiner 282 determines the number of receiving antennas. In the analysis phase, the number-of-antennas determiner 282 determines a plurality of types of the number of receiving antennas for the same path at different timings. In the normal operation phase, the number-of-antennas determiner 282 reads the communication area at each time from the communication area information stored in the storage 281 and reads information regarding the number of receiving antennas corresponding to the communication area from the area-specific number-of-antennas information stored in the storage 281. However, in the normal operation phase, the number-of-antennas determiner 282 determines to use a larger number of receiving antennas than the number of receiving antennas indicated by the area-specific number-of-antennas information every time the mobile relay station passes through the same path a predetermined number of times. For example, the number-of-antennas determiner 282 determines the number N of all the antennas 210 as the number of receiving antennas. The number-of-antennas determiner 282 updates the area-specific number-of-antennas information stored in the storage 281 by using the communication area information transmitted from the base station 403. Further, the number-of-antennas determiner 282 increases the number of receiving antennas set in the area-specific number-of-antennas information in response to an instruction from the base station 403.

The base station 403 in FIG. 13 is different from the base station 401 in FIG. 2 in that the base station 403 further includes a base station signal transmission processor 460, a transmitter 470, an instructor 480, and an analysis reception processor 490. An external apparatus connected to the base station 403 may include one or both of the instructor 480 and the analysis reception processor 490.

The instructor 480 includes a storage 481 and an analyzer 482. The storage 481 stores communication area information of each mobile relay station 203. In the analysis phase, the analyzer 482 determines, for each mobile relay station 203, the required number of receiving antennas in each communication area on the basis of the decoding success rate in the terminal signal reception processor 440. The analyzer 482 generates, for each mobile relay station 203, area-specific number-of-antennas information in which the communication area and the required number of receiving antennas are associated with each other. The analyzer 482 notifies each mobile relay station 203 of the area-specific number-of-antennas information generated for the mobile relay station. In the normal operation phase, in a case where the decoding success rate in the terminal signal reception processor 440 is lower than a predetermined value, the analyzer 482 instructs the mobile relay stations 203 to increase the number of receiving antennas. The analyzer 482 analyzes the required number of receiving antennas by using waveform data of all the antennas 210 periodically transmitted from the mobile relay station 203 in the normal operation phase. For the analysis, the analyzer 482 outputs waveform data of the number of receiving antennas to the analysis reception processor 490 while changing the number of receiving antennas and causes the analysis reception processor to execute reception processing, thereby obtaining the decoding success rate. The analyzer 482 determines the required number of receiving antennas of the mobile relay station 203 on the basis of a relationship between the number of receiving antennas and the decoding success rate.

The analysis reception processor 490 includes a distributor 491, N frequency converters 492, a signal processor 493, and a terminal signal decoder 494. The N frequency converters 492 will be referred to as frequency converters 492-1 to 492-N. The distributor 491 receives waveform data from the analyzer 482 and outputs the received waveform data to different frequency converters 492. The frequency converters 492-1 to 492-N, the signal processor 493, and the terminal signal decoder 494 have functions similar to those of the frequency converters 442-1 to 442-N, the signal processor 443, and the terminal signal decoder 444, respectively. The terminal signal reception processor 440 may also serve as the analysis reception processor 490.

Processing of the analysis phase will be described. In the analysis phase, the wireless communication system 103 transmits and receives terminal uplink signals in which terminal transmission data is set by processing similar to that of the first embodiment in FIG. 3. The wireless communication system 103 performs processing in FIG. 14 for each mobile relay station 203 in the analysis phase.

Figure 14:
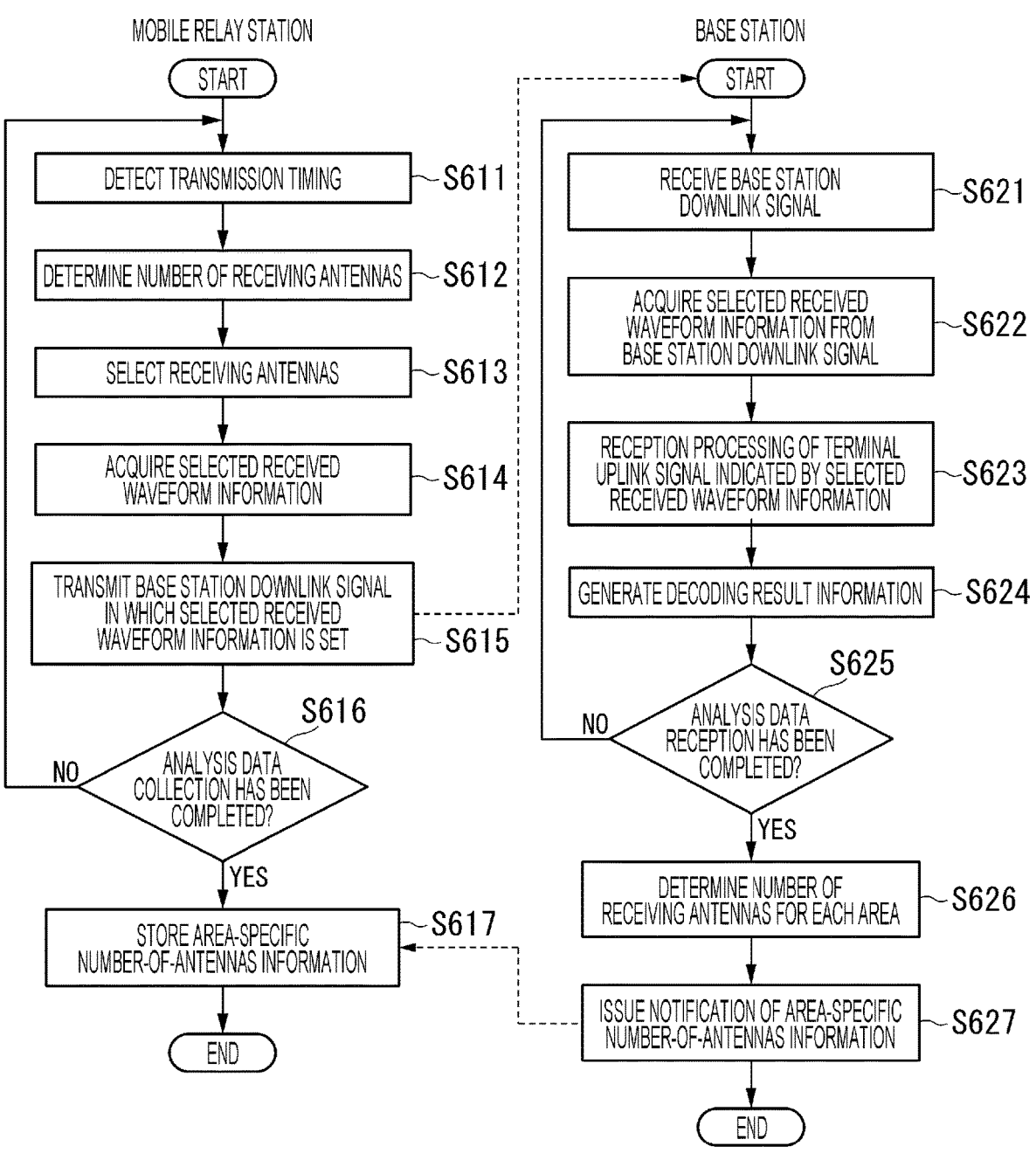
FIG. 14 is a flowchart showing processing of the wireless communication system according to the embodiment.

FIG. 14 is a flowchart showing processing of the wireless communication system 103 in the analysis phase. First, when detecting that the current time is a transmission start timing, the controller 262a of the mobile relay station 203 instructs the transmission data modulator 263 and the transmitter 264 to transmit the received waveform information (step S611).

The number-of-antennas determiner 282 determines the number of receiving antennas in which the number of times previously determined in the same path as the current path is less than the threshold (step S612). Here, the threshold is an integer of 1 or more. The number-of-antennas determiner 282 may change the number of receiving antennas every time the mobile relay station passes through the same path or may change the number of receiving antennas every time the mobile relay station passes through the same path a predetermined plurality of times. The antenna selector 243 selects the antennas 210 of the number of receiving antennas determined in step S612 from among the N antennas 210 (step S613). The transmission data reader 244 reads, as selected received waveform information, received waveform information in which antenna identification information of the antennas 210 selected in step S613 is set from the received waveform information at the same reception time stored in the data storage 230 (step S614).

The base station communicator 260a transmits base station downlink signals in which the selected received waveform information is set by MIMO by processing similar to that in step S313 of FIG. 5 (step S615). The transmission data controller 280 determines whether or not collection of analysis data has been completed (step S616). For example, in a case where the number of times in which the received waveform information has been by using each of the numbers N1 to N (N1 is an integer of 1 or more) of receiving antennas for the same path reaches the threshold, the transmission data controller 280 determines that the collection has been completed. In a case where the collection of the analysis data has not been completed (step S616: NO), the mobile relay station 203 repeats the processing from step S611.

The base station 403 receives the base station downlink signals transmitted by the mobile relay station 203 in step S615 and performs processing similar to that in steps S321 to S323 of FIG. 5 (steps S621 to S623).

The analyzer 482 acquires, from the base station signal reception processor 430, identification information of the mobile relay station 203 read from the base station downlink signals. Further, the analyzer 482 receives, from the terminal signal reception processor 440, information regarding the reception time given to the selected received waveform information obtained from the base station downlink signals, information regarding the number of receiving antennas at the reception time, and information regarding the decoding success rate of the waveform data obtained from the selected received waveform information at the reception time. For example, the information regarding the number of receiving antennas is obtained as the number of pieces of the selected received waveform information to which the same reception time is given. The analyzer 482 reads the information regarding the communication area corresponding to the reception time from the communication area information stored in the storage 481 in association with the identification information of the mobile relay station 203. The analyzer 482 generates decoding result information in which the identification information of the mobile relay station 203, the information regarding the reception time, the information regarding the communication area, the information regarding the number of receiving antennas, and the decoding success rate are associated with one another and writes the generated decoding result information to the storage 481 (step S624).

In a case where the reception of the analysis data has not been completed (step S625: NO), the base station 403 repeats the processing from step S621. In a case where the reception of the analysis data is completed (step S625: YES), the base station 403 performs the processing in step S626.

The analyzer 482 analyzes the relationship between the number of receiving antennas and the decoding success rate for each communication area by using the decoding result information generated in step S624 and determines the required number of receiving antennas for each communication area (step S626). Specifically, an average of the number of receiving antennas for which the decoding success rate equal to or higher than a predetermined rate is obtained in a certain communication area is denoted by Na, and a maximum value thereof is denoted by Nmax. The analyzer 482 may set the required number of receiving antennas to Na or Nmax, a number obtained by adding a predetermined number to Na or Nmax, or a number obtained by increasing Na or Nmax by a predetermined ratio. The analyzer 482 generates area-specific number-of-antennas information in which the communication area and the required number of receiving antennas determined for the communication area are associated with each other.

The mobile relay station 203 communicates with the same communication area while moving. Therefore, the analyzer 482 determines the number of receiving antennas by using not only a result of the reception processing of the selected received waveform information obtained when the mobile relay station 203 is located at a specific position but also a result of the reception processing of the selected received waveform information obtained when the mobile relay station is located near the specific position. A result of the reception processing indicating whether or not the decoding has been succeeded represents communication quality between the mobile relay station 203 and the terminal stations 301.

The analyzer 482 outputs the area-specific number-of-antennas information of the mobile relay station 203 to the base station signal transmission processor 460. Therefore, the base station 403 transmits base station uplink signals in which the area-specific number-of-antennas information is set to the mobile relay station 203 (step S627).

After the transmission data controller 280 determines that the collection of the analysis data has been completed (step S616: YES), the mobile relay station 203 receives the base station uplink signals transmitted by the base station 403 in step S627. The base station communicator 260a of the mobile relay station 203 performs reception processing of the base station uplink signals, thereby acquiring the area-specific number-of-antennas information. The base station communicator 260a outputs the acquired area-specific number-of-antennas information to the transmission data controller 280. The number-of-antennas determiner 282 of the transmission data controller 280 writes the area-specific number-of-antennas information to the storage 281 (step S617).

After the analysis phase, the wireless communication system 103 starts the normal operation phase. In the normal operation phase, the wireless communication system 103 transmits and receives terminal uplink signals in which terminal transmission data is set by processing similar to that of the first embodiment in FIG. 3. Further, the wireless communication system 103 performs the following processing in the normal operation phase.

FIG. 15 is a flowchart showing processing of the mobile relay station 203 in the normal operation phase. The number-of-antennas determiner 282 of the mobile relay station 203 determines a period P for updating the required number of receiving antennas (step S711). The period P can be arbitrarily determined. The number-of-antennas determiner 282 sets an initial value 1 to the number of times p of passing through the same path (step S712).

When detecting that the current time is a transmission start timing, the controller 262a instructs the transmission data modulator 263 and the transmitter 264 to transmit the received waveform information (step S713). When determining that the number of times p of passing through the same path has not reached the period P (step S714: NO), the number-of-antennas determiner 282 determines the number of receiving antennas on the basis of the area-specific number-of-antennas information (step S715). That is, the number-of-antennas determiner 282 reads information regarding the oldest reception time of untransmitted received waveform information stored in the data storage 230. The number-of-antennas determiner 282 acquires information regarding the communication area at the read reception time from the area information stored in the storage 281. The number-of-antennas determiner 282 further reads the number of receiving antennas in the read communication area from the area-specific number-of-antennas information stored in the storage 281. The number-of-antennas determiner 282 adds 1 to the number of times p of passing through the same path (step S716).

The antenna selector 243 selects the antennas 210 of the number of receiving antennas determined in step S716 from among the N antennas 210. The transmission data reader 244 reads, as selected received waveform information, received waveform information in which antenna identification information of the selected antennas 210 is set from the received waveform information at the same reception time stored in the data storage 230 (step S717). The transmission data modulator 263 acquires the selected received waveform information output by the transmission data reader 244 in step S717 as transmission data. The base station communicator 260a sets the transmission data in base station downlink signals and transmits the base station downlink signals from the antennas 270 by MIMO (step S718).

Meanwhile, when determining that the number of times p of passing through the same path has reached the period P (step S714: YES), the number-of-antennas determiner 282 determines a maximum value as the number of receiving antennas (step S719). Here, the maximum value is the number N of all the antennas 210. The number-of-antennas determiner 282 sets 1 to the number of times p of passing through the same path (step S720). The antenna selector 243 selects the antennas 210-1 to 210-N. The transmission data reader 244 reads the received waveform information of all the antennas 210 from the data storage 230 as the selected received waveform information (step S717).

The transmission data modulator 263 acquires the selected received waveform information output from the transmission data reader 244 as transmission data. The base station communicator 260a sets the transmission data in base station downlink signals and transmits the base station downlink signals from the antennas 270 by MIMO (step S718).

When receiving an instruction to increase the number of receiving antennas from the base station 403 (step S721: YES), the mobile relay station 203 increases the number of receiving antennas stored in the area-specific number-of-antennas information corresponding to the communication area set in the instruction to increase the number of receiving antennas (step S722). When not receiving the instruction to increase the number of receiving antennas from the base station 403 (step S721: NO) or after the processing in step S722, the mobile relay station 203 repeats the processing from step S713.

Figure 16:
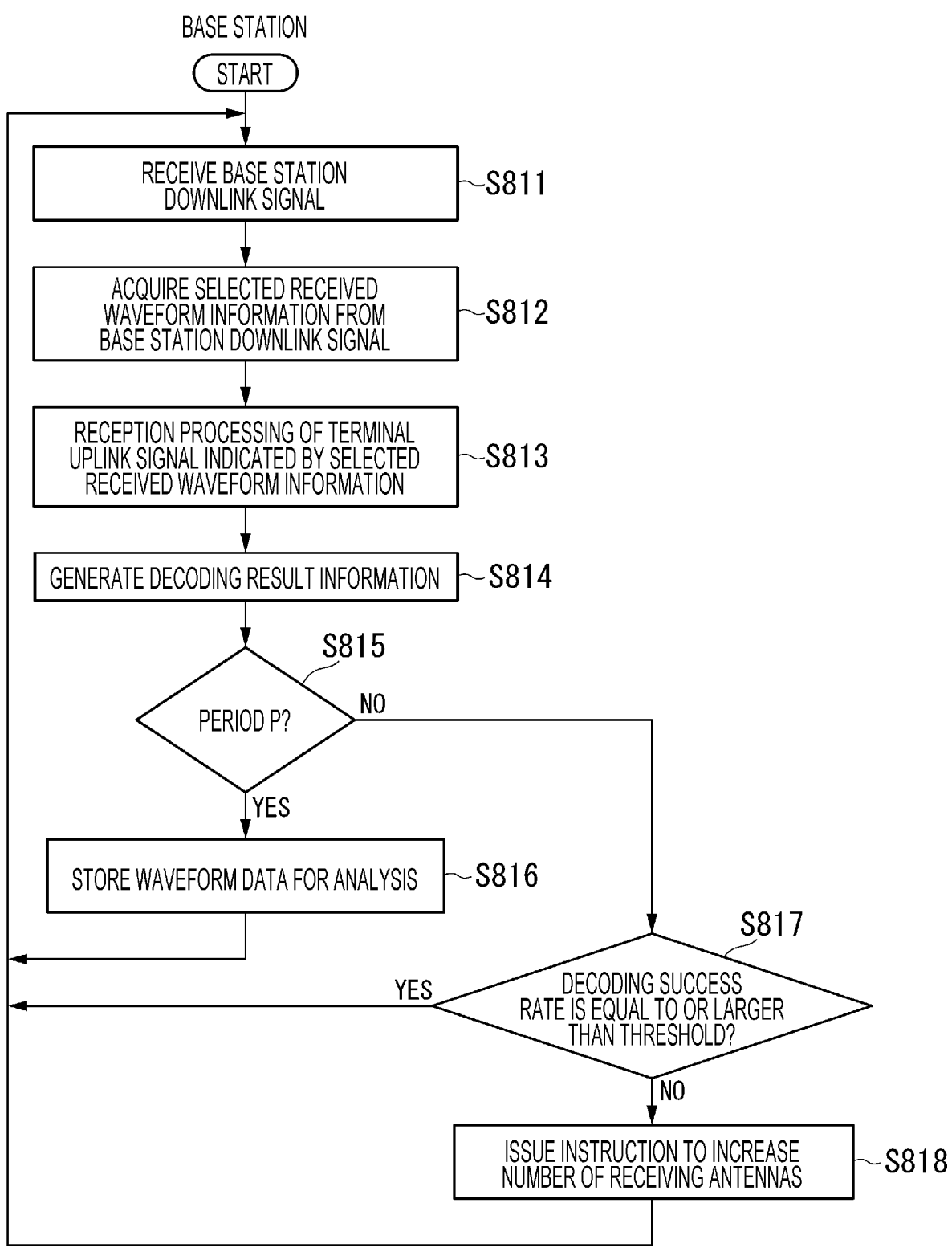
FIG. 16 is a flowchart showing processing of a base station according to the embodiment.

FIG. 16 is a flowchart showing processing of the base station 403 in the normal operation phase. The base station 403 receives the base station downlink signals transmitted by the mobile relay station 203 in step S717 of FIG. 15 and performs processing similar to that in steps S621 to S624 of FIG. 14 (steps S811 to S814).

The analyzer 482 determines whether or not the current time is in the period P (step S815). When determining that the current period is in the period P (step S815: YES), the analyzer 482 writes analysis waveform data to the storage 481 (step S816). The analyzer 482 may determine that the time is in the period P in a case where the number of receiving antennas is the number N of all the antennas 210. The analysis waveform data is information in which the identification information of the mobile relay station 203 read from the base station downlink signals, the reception time given to the waveform data, the communication area, the antenna identification information of each antenna 210, and the received waveform data of each antenna 210 are associated with one another. The analyzer 482 reads information regarding the communication area corresponding to the reception time from the communication area information of the mobile relay station 203. The base station 403 repeats the processing from step S811.

Meanwhile, when determining that the current time is not in the period P (step S815: NO), the analyzer 482 determines whether or not the decoding success rate is equal to or larger than the threshold (step S817). When determining that the decoding success rate is equal to or larger than the threshold (step S817: YES), the analyzer 482 repeats the processing from step S811.

When determining that the decoding success rate is less than the threshold (step S817: NO), the analyzer 482 reads, from the communication area information stored in the storage 481, information regarding the communication area corresponding to information regarding the reception time when the decoding success rate has been obtained. The analyzer 482 outputs, to the base station signal transmission processor 460, an instruction to increase the number of receiving antennas in which the read communication area information is set. Therefore, the base station 403 transmits base station uplink signals in which the instruction to increase the number of receiving antennas is set to the mobile relay station 203 (step S818) and repeats the processing from step S811.

The mobile relay station 203 receives the base station uplink signals transmitted in step S818 (step S721 in FIG. 15: YES). The base station communicator 260a of the mobile relay station 203 performs reception processing of the base station uplink signals, thereby acquiring the instruction to increase the number of receiving antennas. The base station communicator 260a outputs the acquired instruction to increase the number of receiving antennas to the transmission data controller 280. In step S722 of FIG. 15, the number-of-antennas determiner 282 of the transmission data controller 280 increases the number of receiving antennas stored in the area-specific number-of-antennas information corresponding to the communication area set in the instruction to increase the number of receiving antennas by a predetermined number or a predetermined ratio. The analyzer 482 of the base station 403 may set, in the instruction to increase the number of receiving antennas, information regarding the number or ratio of the number of receiving antennas to be increased. The analyzer 482 may transmit the instruction to increase the number of receiving antennas in a case where the number of times in which the decoding success rate has not reached the threshold in the same communication area reaches a predetermined number of times.

As described above, in order to accurately grasp the required number of antennas, the mobile relay station 203 transmits waveform data of all the receiving antennas to the base station 403 on a regular basis, for example, once a month, also in the normal operation phase. The base station 403 or an analysis apparatus on the ground performs the reception processing while changing the number of receiving antennas of waveform data to be used in the received waveform data of all the receiving antennas and analyzes the required number of antennas. In a case where the analysis is performed once a month, the period P is the number of times of passing through the path in one month.

Figure 17:
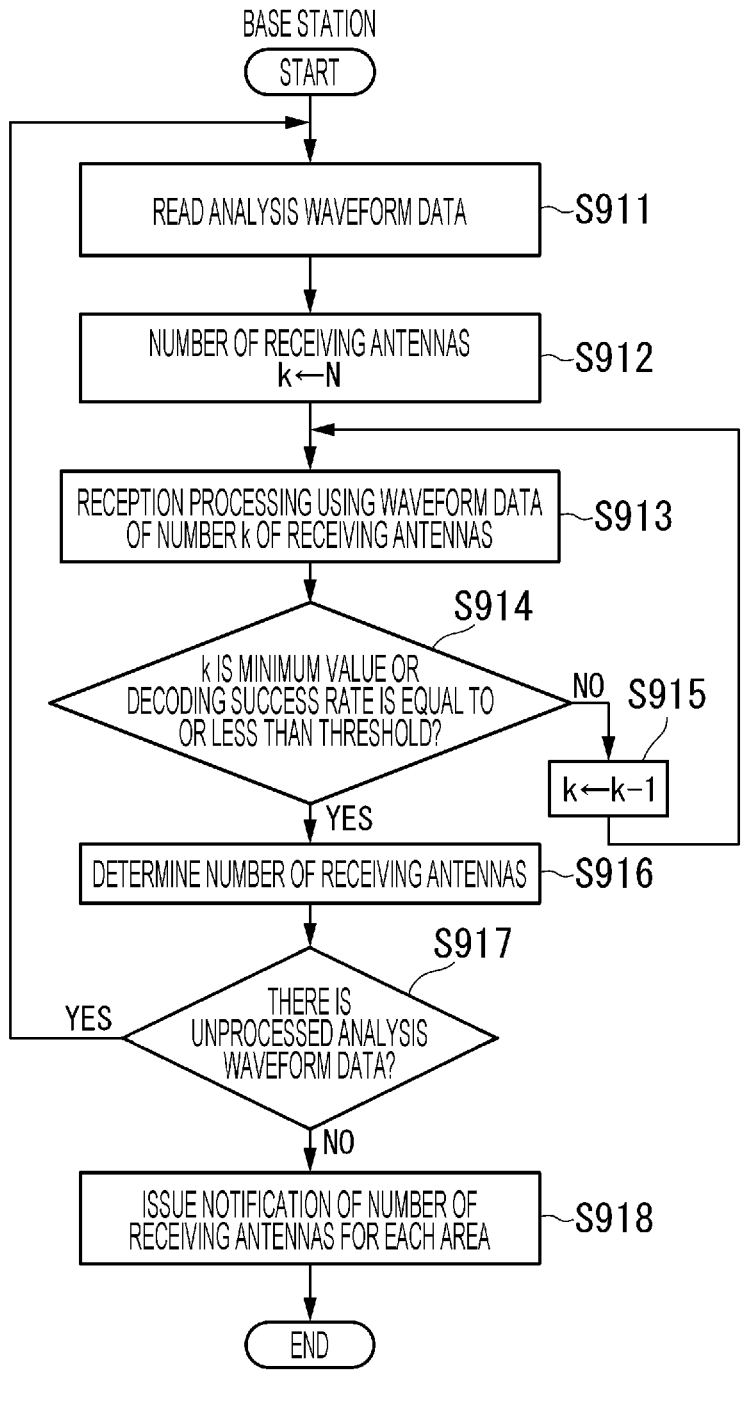
FIG. 17 is a flowchart showing processing of the base station according to the embodiment.

FIG. 17 shows analysis processing of the number of receiving antennas using the decoding result in the period P. The base station 403 performs the processing in FIG. 17 for each mobile relay station 203. The analyzer 482 reads the analysis waveform data from the storage 481 (step S911). The analyzer 482 reads the waveform data of each receiving antenna from the analysis waveform data. The analyzer 482 sets an initial value N to the number k of receiving antennas (step S912).

The analyzer 482 selects waveform data of the number k of receiving antennas from the waveform data of the number N of receiving antennas read from the analysis waveform data and outputs the waveform data to the analysis reception processor 490. The analyzer 482 may give, to the selected waveform data, antenna identification information of the antennas 210 through which the waveform data has been obtained. The analysis reception processor 490 executes reception processing by using the waveform data input from the analyzer 482 (step S913). That is, the distributor 491 outputs the waveform data received from the analyzer 482 to k different frequency converters 492. In a case where the antenna identification information is given to the waveform data, the distributor 491 outputs, to the frequency converter 492-n, the waveform data to which the antenna identification information of the antenna 210-n is given. The frequency converters 492 to which the waveform data has been input from the distributor 491 each perform frequency conversion on the received signals represented by the waveform data from RF signals to baseband signals and outputs the received signals subjected to the frequency conversion to the signal processor 493. The signal processor 493 accepts input of the received signals of the baseband signals from the respective frequency converters 492 to which the waveform data has been input among the frequency converters 492-1 to 492-N. The signal processor 493 performs frame detection (terminal signal detection), Doppler shift compensation, and offline beam control on each input received signal and adds and combines the received signals. The signal processor 493 outputs a symbol of the added and combined received signals to the terminal signal decoder 494. The terminal signal decoder 494 decodes the symbol input from the signal processor 493, thereby obtaining the terminal transmission data. The terminal signal decoder 494 notifies the analyzer 482 of the decoding success rate.

The analyzer 482 determines whether or not at least one of a condition in which the number k of receiving antennas has reached a predetermined minimum value or a condition in which the decoding success rate is equal to or less than the threshold is satisfied (step S914). When determining that none of the conditions is satisfied (step S914: NO), the analyzer 482 subtracts 1 from a value of the number k of receiving antennas (step S915). The analyzer 482 repeats the processing from step S913.

When determining in step S914 that one or both of the conditions are satisfied (step S914: YES), the analyzer 482 determines the number of receiving antennas for the analysis waveform data read in step S911 (step S916). For example, when the decoding success rate is less than the threshold, the analyzer 482 sets k+1 as the number of receiving antennas, whereas, when the decoding success rate is equal to or more than the threshold, the analyzer sets the current k as the number of receiving antennas. The analyzer 482 adds information regarding the determined number of receiving antennas to the analysis waveform data.

The analyzer 482 determines whether or not there is unprocessed data in the analysis waveform data stored in the storage 481 (step S917). When determining that there is unprocessed analysis waveform data (step S917: YES), the analyzer 482 performs the processing from step S911. When determining that there is no unprocessed analysis waveform data (step S917: NO), the analyzer 482 performs the processing in step S918.

The analyzer 482 determines the number of receiving antennas in the communication area on the basis of the number of receiving antennas determined for the analysis waveform data in which the same communication area is set (step S918). For example, the analyzer 482 may determine an average or maximum value of the number of receiving antennas determined for the analysis waveform data in which the same communication area is set, a number obtained by adding a predetermined number to the average, a number obtained by adding a predetermined number to the maximum value, a number obtained by increasing the average by a predetermined ratio, a number obtained by increasing the maximum value by a predetermined ratio, or the like. The analyzer 482 generates area-specific number-of-antennas information indicating the number of receiving antennas determined for each communication area. The analyzer 482 outputs the area-specific number-of-antennas information of the mobile relay station 203 to the base station signal transmission processor 460. Therefore, the base station 403 transmits base station uplink signals in which the area-specific number-of-antennas information is set to the mobile relay station 203 (step S919).

The base station communicator 260a of the mobile relay station 203 performs reception processing of the base station uplink signals, thereby acquiring the area-specific number-of-antennas information. The number-of-antennas determiner 282 of the transmission data controller 280 writes the area-specific number-of-antennas information acquired by the base station communicator 260*a* to the storage 281.

According to the third embodiment, the wireless communication system can determine the number of receiving antennas for each communication area of the mobile relay station on the basis of the past actual communication quality.

Fourth Embodiment

In a fourth embodiment, a situation in which IoT interference signals on the ground are generated is analyzed based on waveform data acquired by waveform sampling apparatuses installed at multiple points on the ground, and the required number of receiving antennas is calculated, and then a mobile relay station is notified of the number of receiving antennas before the mobile relay station transmits waveform data via base station downlink signals. The mobile relay station transmits waveform data of the antennas of the notified required number of receiving antennas via the base station downlink signals. The fourth embodiment will be described by focusing on differences from the above embodiments.

Figure 18:
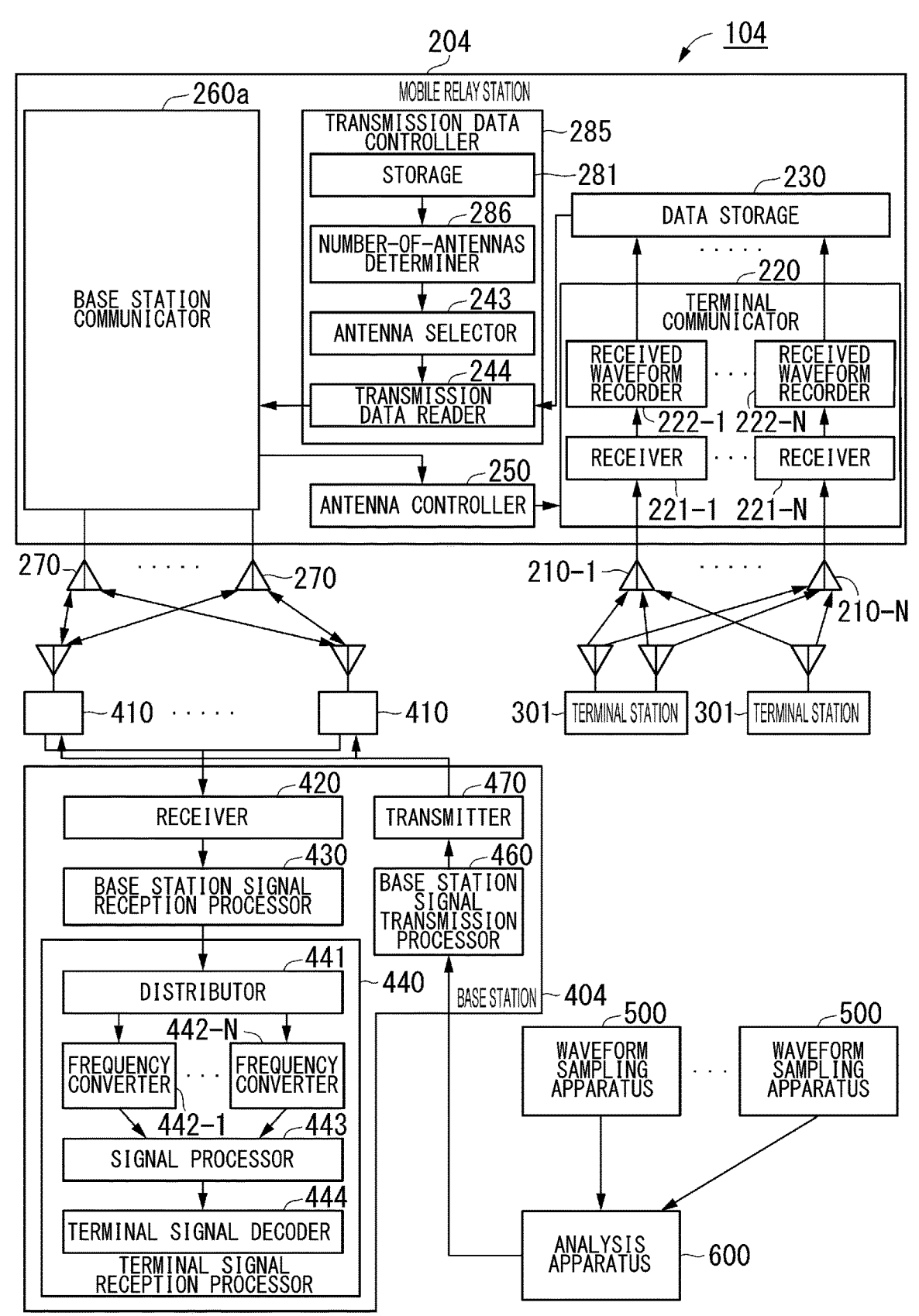
FIG. 18 is a configuration diagram of a wireless communication system according to a fourth embodiment.

FIG. 18 is a configuration diagram of a wireless communication system 104 according to the fourth embodiment. In FIG. 18, the same parts as those of the wireless communication system 101 according to the first embodiment in FIG. 2 and those of the wireless communication system 103 according to the third embodiment in FIG. 13 will be denoted by the same reference signs, and description thereof will be omitted. The wireless communication system 104 includes a mobile relay station 204, the terminal station 301, the base station 404, waveform sampling apparatuses 500, and an analysis apparatus 600. The mobile relay station 204 is used as the mobile relay station 2 in FIG. 1, and the base station 404 is used as the base station 4 in FIG. 1.

The mobile relay station 204 is different from the mobile relay station 203 in FIG. 13 in that the mobile relay station 204 includes a transmission data controller 285 instead of the transmission data controller 280. The transmission data controller 285 is different from the transmission data controller 280 in that the transmission data controller 285 includes a number-of-antennas determiner 286 instead of the number-of-antennas determiner 282. The number-of-antennas determiner 286 reads the communication area at each time from the communication area information stored in the storage 281 and reads information regarding the number of receiving antennas corresponding to the communication area from the area-specific number-of-antennas information stored in the storage 281.

The base station 404 includes the receiver 420, the base station signal reception processor 430, the terminal signal reception processor 440, the base station signal transmission processor 460, and the transmitter 470. The plurality of waveform sampling apparatuses 500 is set at multiple points on the ground. Each waveform sampling apparatus 500 receives a radio in a band used for terminal uplink signals and notifies the analysis apparatus 600 of a sampling result of the received radio.

The analysis apparatus 600 detects interference generated in the communication area on the basis of waveform data received from the waveform sampling apparatuses 500 installed in the communication area of the mobile relay station 204 or around the communication area. The analysis apparatus 600 stores in advance a calculation expression or relational data indicating a relationship between an intensity of the interference and the number of receiving antennas.

The analysis apparatus 600 determines the number of receiving antennas on the basis of the detected interference and the stored calculation expression or relational data. The analysis apparatus 600 notifies the base station 404 of number-of-antennas information in which the communication area and the number of receiving antennas determined for the communication area are set. The base station 404 transmits a base station uplink signal in which the number-of-antennas information received from the analysis apparatus 600 is set to the mobile relay station 204. The number-of-antennas determiner 286 of the mobile relay station 204 updates the area-specific number-of-antennas information stored in the storage 281 on the basis of the number-of-antennas information acquired by the base station communicator 260*a* from the base station uplink signals.

The wireless communication system 104 performs processing in a similar manner to that in FIGS. 3 and 5 of the first embodiment. The mobile relay station 204 performs processing similar to that in FIG. 4 of the first embodiment except for the following point. That is, the mobile relay station 204 performs the following processing instead of the processing in steps S212 to S213. Specifically, the number-of-antennas determiner 286 acquires information regarding the communication area at the current time from the area information stored in the storage 281. The number-of-antennas determiner 286 further reads the number of receiving antennas in the read communication area from the area-specific number-of-antennas information stored in the storage 281.

According to the fourth embodiment, it is possible to determine the required number of receiving antennas of the mobile relay station on the basis of an actual observation result on the ground.

Fifth Embodiment

In a fifth embodiment, a mobile relay station performs arrival direction estimation processing and controls an amount of data to be transmitted to the ground, that is, the number of receiving antennas, on the basis of a rough estimation result of the number and directions of incoming signals. The fifth embodiment will be described by focusing on differences from the above embodiments.

Figure 19:
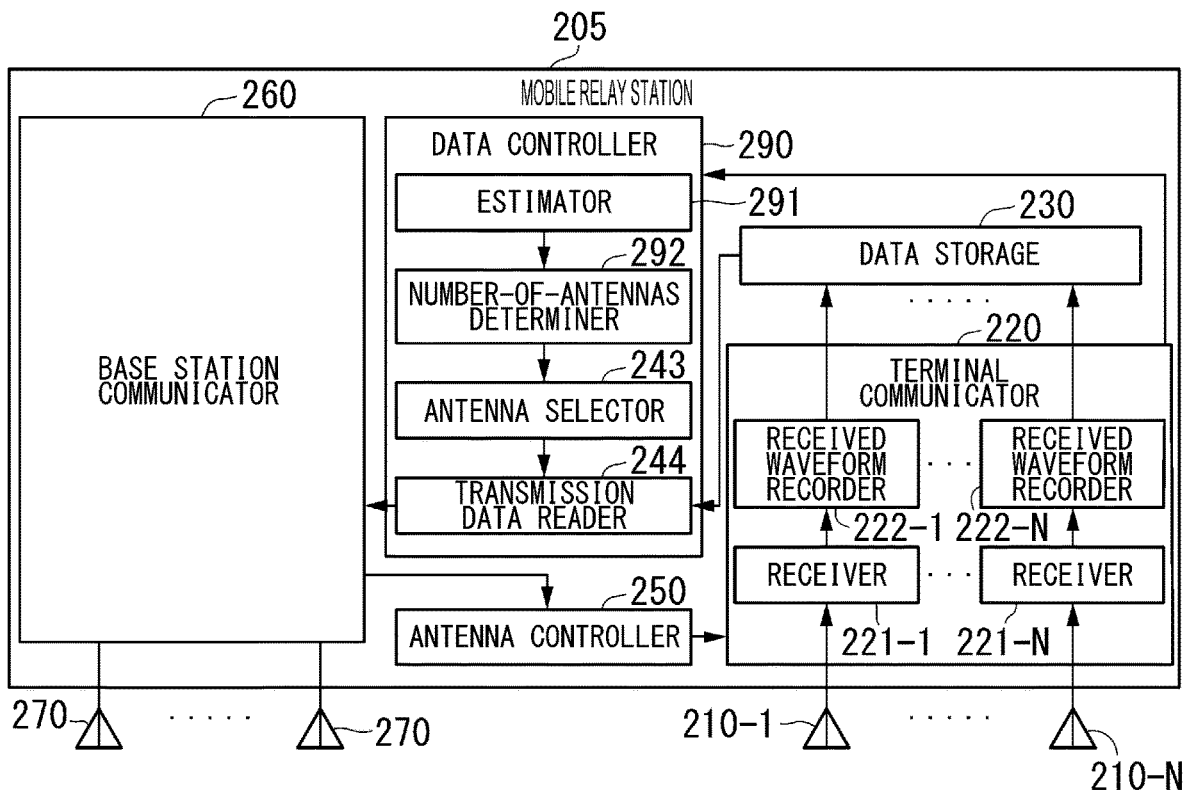
FIG. 19 is a configuration diagram of a mobile relay station according to a fifth embodiment.

FIG. 19 illustrates a configuration of a mobile relay station 205 according to the fifth embodiment. In FIG. 19, the same parts as those of the mobile relay station 201 according to the first embodiment in FIG. 2 will be denoted by the same reference signs, and description thereof will be omitted. The mobile relay station 205 is used as the mobile relay station 2 in FIG. 1.

The mobile relay station 205 is different from the mobile relay station 201 in FIG. 2 in that the mobile relay station 205 includes a transmission data controller 290 instead of the transmission data controller 240. The transmission data controller 290 includes an estimator 291, a number-of-antennas determiner 292, the antenna selector 243, and the transmission data reader 244.

The estimator 291 estimates arrival directions of signals and the number of terminals that have transmitted the signals on the basis of terminal uplink signals received by the receivers 221-1 to 221-N. An arbitrary existing technology is used for the estimation. The number-of-antennas determiner 292 determines the number of receiving antennas on the basis of the estimation result by the estimator 291. The number-of-antennas determiner 292 substitutes the estimation result into a calculation expression for calculating the number of receiving antennas by using the arrival directions of the signals and the number of terminals as parameters, thereby determining the number of receiving antennas. The calculation expression is defined in advance. As the number of terminals increases, reception quality in the mobile relay station 205 deteriorates. Thus, the number of receiving antennas increases. Further, as an angle of elevation represented by each arrival direction increases, the reception quality in the mobile relay station 205 is improved. Thus, the number of receiving antennas may be reduced.

The wireless communication system of the fifth embodiment performs processing in a similar manner to that in FIGS. 3 and 5 of the first embodiment. The mobile relay station 205 of the fifth embodiment performs processing similar to that in FIG. 4 of the first embodiment except for the following point. That is, the mobile relay station 205 performs the following processing instead of the processing in steps S212 to S213. The estimator 291 estimates arrival directions of signals and the number of terminals that have transmitted the signals on the basis of terminal uplink signals received by the receivers 221-1 to 221-N. The number-of-antennas determiner 292 determines the number of receiving antennas on the basis of the estimation result by the estimator 291.

According to the fifth embodiment, it is possible to control the number of receiving antennas on the basis of a reception state estimated in the mobile relay station.

Sixth Embodiment

In a sixth embodiment, a mobile relay station controls the number of transmission antennas used to transmit base station downlink signals in which received waveform information is set. Therefore, the number-of-antennas determiners 242, 247, 282, 286, and 292 determine not only the number of receiving antennas at the reception time t but also the number of transmission antennas at the reception time t. The number-of-antennas determiners 242, 247, 282, 286, and 292 may determine the number of transmission antennas by processing similar to the processing of determining the number of receiving antennas in the above embodiments. Alternatively, the number-of-antennas determiners 242, 247, 282, 286, and 292 may determine the number of transmission antennas corresponding to the number of receiving antennas at each reception time t on the basis of a correspondence between the number of receiving antennas and the number of transmission antennas determined in advance.

The antenna selector 243 selects, from among M antennas 270, the antennas 270 having the number of transmission antennas determined by the number-of-antennas determiners 242, 247, 282, 286, and 292. For example, the antenna selector 243 performs the selection by processing similar to the processing of selecting the antennas 210 of the number of receiving antennas. The selected antennas 270 will also be referred to as selected transmission antennas. The antenna controller 250 notifies the base station communicators 260 and 260a of the number m of transmission antennas (m is an integer of M or less) and the selected transmission antennas at the reception time t.

The transmission data modulator 263 of the base station communicators 260 and 260a acquires the received waveform information at the reception time t from the transmission data reader 244 as transmission data. The transmission data modulator 263 converts the transmission data into parallel signals to be transmitted by the m selected transmission antennas. The transmission data modulator 263 modulates the generated parallel signals. Thus, base station downlink signals to be transmitted by the m selected transmission antennas are generated.

The transmitter 264 includes a power amplifier corresponding to each antenna 270. When transmitting the base station downlink signals generated by the transmission data modulator 263 from the m selected transmission antennas, the antenna controller 250 supplies power to the power amplifiers corresponding to the selected transmission antennas and turns off power supply to the power amplifiers corresponding to the antennas 270 other than the selected transmission antennas. Thus, the base station downlink signals are transmitted from the selected transmission antennas.

In a case where the transmitter 264 multiplies the base station downlink signal transmitted from each antenna 270 by a weight, an appropriate weight varies depending on the number of transmission antennas. Therefore, information in which the number of transmission antennas and a transmission weight of each selected transmission antenna at each time are associated with each other is stored in advance in the storages 261 and 261a. When transmitting the base station downlink signal from each of the selected transmission antennas of the number m of transmission antennas, the controllers 262 and 262a read, from the storages 261 and 261a, a transmission time and the transmission weight of each of the selected transmission antennas corresponding to the number m of transmission antennas. The controllers 262 and 262a instruct the transmitter 264 to weight each parallel signal modulated by the transmission data modulator 263 with the transmission weight of the selected transmission antenna that transmits the parallel signal. The transmitter 264 weights the parallel signal generated by the transmission data modulator 263 with a weight issued by the controllers 262 and 262a and generates a base station downlink signal to be transmitted from each selected transmission antenna.

The number-of-antennas determiners 452 and 457 may determine the number of transmission antennas at each reception time t by processing similar to the processing of determining the number of receiving antennas. Alternatively, the number-of-antennas determiners 452 and 457 may determine the number of transmission antennas corresponding to the number of receiving antennas at each reception time t on the basis of the correspondence between the number of receiving antennas and the number of transmission antennas determined in advance. The antenna selector 453 selects transmission antennas of the number of transmission antennas from among the M antennas 270 by processing similar to the processing of selecting the antennas 210 of the number of receiving antennas. The antenna selector 453 further sets antenna identification information of the selected transmission antennas at the reception time t to the antenna selection information to be transmitted to the mobile relay station. Alternatively, the number-of-antennas determiners 452 and 457 further set the number of transmission antennas at each reception time t to the number-of-antennas information to be transmitted to the mobile relay station.

The analyzer 482 may set information regarding the number of transmission antennas determined according to the number of receiving antennas to the area-specific number-of-antennas information. The analysis apparatus 600 may set the information regarding the number of transmission antennas determined according to the number of receiving antennas to the number-of-antennas information.

According to the sixth embodiment, power supply of a MIMO transmission system that is not needed when the mobile relay station transmits base station downlink signals is turned off. This makes it possible to further reduce power consumption.

Seventh Embodiment

In the above embodiments, the frequency conversion of terminal uplink signals is performed in the base station. In the present embodiment, the frequency conversion is performed in a mobile relay station. The mobile relay station transmits waveform data of the terminal uplink signals subjected to the frequency conversion to the base station. Hereinafter, the present embodiment will be described by focusing on differences from the wireless communication system 101 of the first embodiment. However, similar differences can be applied to the wireless communication system 101$a$ of the first embodiment and the second to sixth embodiments.

Figure 20:
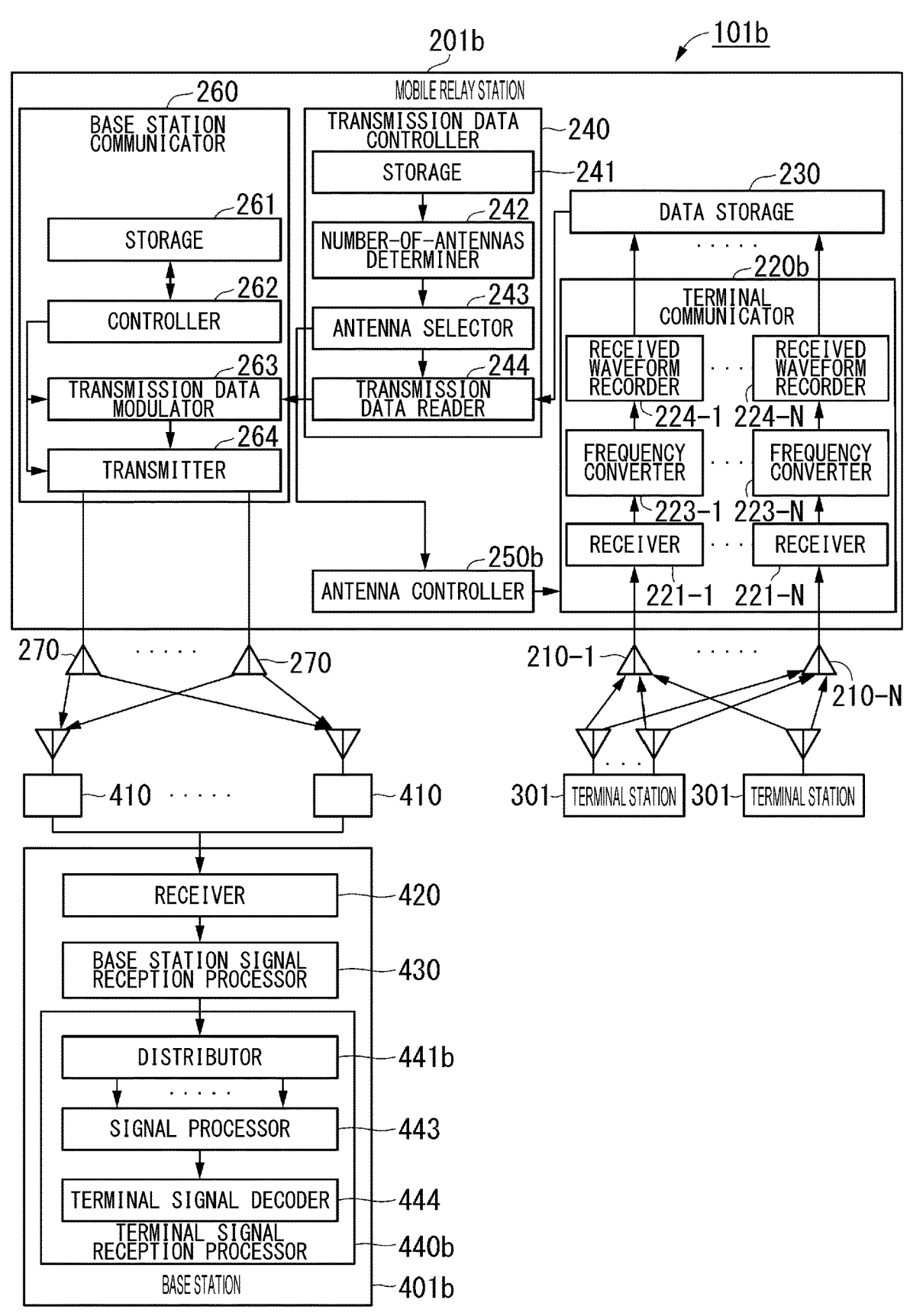
FIG. 20 is a configuration diagram of a mobile relay station according to a seventh embodiment.

FIG. 20 is a configuration diagram of a wireless communication system 101$b$. In FIG. 20, the same parts as those of the wireless communication system 101 in FIG. 2 will be denoted by the same reference signs, and description thereof will be omitted. The wireless communication system 101$b$ includes a mobile relay station 201$b$, the terminal station 301, and a base station 401$b$. The mobile relay station 201$b$ is used as the mobile relay station 2 in FIG. 1, and the base station 401$b$ is used as the base station 4 in FIG. 1.

The mobile relay station 201$b$ in FIG. 20 is different from the mobile relay station 201 in FIG. 2 in that the mobile relay station 201$b$ includes a terminal communicator 220$b$ and an antenna controller 250$b$ instead of the terminal communicator 220 and the antenna controller 250. The terminal communicator 220$b$ includes the N receivers 221, N frequency converters 223, and N received waveform recorders 224. A frequency converter 223 connected to the receiver 221-$n$ will be referred to as a frequency converter 223-$n$, and a received waveform recorder 224 connected to the frequency converter 223-$n$ will be referred to as a received waveform recorder 224-$n$.

The frequency converters 223-$n$ performs frequency conversion on a terminal uplink signal received by the receiver 221-$n$ from an RF signal to a baseband signal. The frequency conversion is performed by using a quadrature demodulator or the like. The received waveform recorder 224-$n$ samples a waveform of the terminal uplink signal subjected to the frequency conversion by the frequency converter 223-$n$ and generates waveform data indicating a value obtained by the sampling. The received waveform recorder 224-$n$ writes, to the data storage 230, received waveform information in which the antenna identification information of the antenna 210-$n$, a reception time of the terminal uplink signal in the antenna 210-$n$, and the generated waveform data are set.

The antenna controller 250$b$ stops operation of the receiver 221-$n$, the frequency converter 223-$n$, and the received waveform recorder 224-$n$ corresponding to the antenna 210-$n$ other than the selected receiving antennas.

The base station 401$b$ is different from the base station 401 in FIG. 2 in that the base station 401$b$ includes a terminal signal reception processor 440$b$ instead of the terminal signal reception processor 440. The terminal signal reception processor 440$b$ includes a distributor 441$b$, the signal processor 443, and the terminal signal decoder 444. The distributor 441$b$ reads waveform data of each receiving antenna at the same reception time from the received waveform information and outputs a received signal represented by the read waveform data to the signal processor 443.

In step S122 of FIG. 3, the frequency converter 223-$n$ of the mobile relay station 201$b$ performs frequency conversion on the terminal uplink signal received by the receiver 221-$n$ from an RF signal to a baseband signal. The received waveform recorder 224-$n$ samples a waveform of the terminal uplink signal subjected to the frequency conversion by the frequency converter 223-$n$ and generates waveform data indicating a value obtained by the sampling. The received waveform recorder 224-$n$ writes, to the data storage 230, received waveform information in which the antenna identification information of the antenna 210-$n$, a reception time of the terminal uplink signal in the antenna 210-$n$, and the generated waveform data are set.

In step S323 of FIG. 5, the distributor 441$b$ reads waveform data having the same reception time from the received waveform information. The distributor 441$b$ adds antenna identification information associated with the waveform data to the read waveform data and outputs the waveform data to the signal processor 443. Processing after the received signal is input to the signal processor 443 is similar to that in the above embodiments.

In a case where the base station 403 of the third embodiment in FIG. 13 includes the terminal signal reception processor 440$b$ instead of the terminal signal reception processor 440, the analysis reception processor 490 does not include the frequency converter 492. The distributor 491 outputs the waveform data received from the analyzer 482 to the signal processor 493.

According to the present embodiment, the mobile relay station records the waveform data of the terminal uplink signals subjected to the frequency conversion. This makes it possible to reduce the amount of the waveform data. Therefore, it is possible to reduce an amount of data of base station downlink signals, as compared with the first to sixth embodiments.

Figure 21:
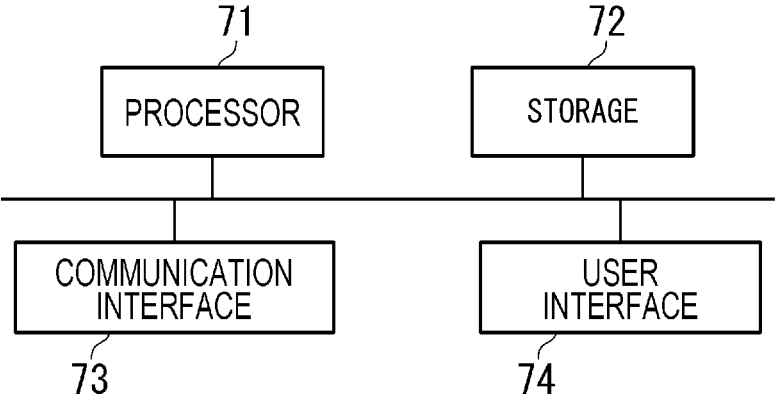
FIG. 21 is a hardware configuration diagram of the mobile relay stations according to the first to seventh embodiments.

A hardware configuration example of the mobile relay stations 201, 201$a$, 201$b$, 202, 203, 204, and 205 will be described. FIG. 21 is a apparatus configuration diagram illustrating the hardware configuration example of the mobile relay stations 201, 201$a$, 201$b$, 202, 203, 204, and 205. The mobile relay stations 201, 201$a$, 201$b$, 202, 203, 204, and 205 include a processor 71, a storage 72, a communication interface 73, and a user interface 74.

The processor 71 is a central processing apparatus that performs calculation and control. The processor 71 is a central processing unit (CPU), for example. The storage 72 is a storage apparatus such as various memories and a hard disk. The processor 71 reads a program from the storage 72 and executes the program, thereby implementing the transmission data controllers 240, 240$a$, 245, 280, 285, and 290 and the antenna controllers 250 and 250$b$. Some of the functions of the transmission data controllers 240, 240$a$, 245, 280, 285, and 290 and the antenna controllers 250 and 250$b$ may be implemented by using hardware such as an application specific integrated circuit (ASIC), a programmable logic apparatus (PLD), or a field programmable gate array (FPGA). The storage 72 further includes a work area and the like to be used when the processor 71 executes various programs. The communication interface 73 is communicably connected to another apparatus. The communication interface 73 corresponds to the terminal communicator 220 and the base station communicators 260 and 260$a$. The user interface 74 is an input apparatus such as a keyboard, a pointing apparatus (e.g. mouse or tablet), buttons, or a touchscreen or a display apparatus such as a display. Artificial operations are input through the user interface 74.

A hardware configuration of the base stations 401, 401*a*, 401*b*, 402, 403, and 404 is also similar to that in FIG. 21. The processor 71 reads a program from the storage 72 and executes the program, thereby implementing the control information generators 450 and 455 and the instructor 480. The communication interface 73 corresponds to the receiver 420, the base station signal reception processor 430, the terminal signal reception processor 440, the base station signal transmission processor 460, and the transmitter 470.

A hardware configuration of the analysis apparatus 600 is also similar to that in FIG. 21. The communication interface 73 communicates with the waveform sampling apparatuses 500 and the base station 404.

According to the embodiments described above, it is possible to reduce an amount of data when the relay apparatus relays received data while moving. In the above embodiments, there has been described a case where a moving body provided with the mobile relay station is the LEO satellite. However, the moving body may be another flying object flying above the sky, such as a geosynchronous satellite, drone, or HAPS.

According to the above embodiments, the wireless communication system includes a first communication apparatus, a second communication apparatus, and a mobile relay apparatus. For example, the first communication apparatus is the terminal stations 3 and 301, the second communication apparatus is the base stations 4, 401, 401*a*, 401*b*, 402, 403, and 404, and the relay apparatus is the mobile relay stations 2, 201, 201*a*, 201*b*, 202, 203, 204, and 205.

The relay apparatus includes a first signal receiver, a received waveform recorder, and a second signal transmitter. For example, the first signal receiver is the receiver 221 and the frequency converter 223, the received waveform recorder is the received waveform recorders 222 and 224, and the second signal transmitter is the base station communicators 260 and 260*a*. The first signal receiver receives wireless first signals transmitted from the first communication apparatus through a plurality of receiving antennas. The received waveform recorder generates waveform data indicating waveforms of the first signals received by the respective plurality of receiving antennas. The second signal transmitter transmits second signals indicating the waveform data to the second communication apparatus.

The second communication apparatus includes a second signal receiver, a second signal reception processor, and a first signal reception processor. For example, the second signal receiver is the receiver 420, the second signal reception processor is the base station signal reception processor 430, and the first signal reception processor is the terminal signal reception processors 440 and 440*b*. The second signal receiver receives the second signals transmitted from the relay apparatus. The second signal reception processor performs reception processing of the second signals received by the second signal receiver to acquire the waveform data. The first signal reception processor performs reception processing of the first signals indicated by the waveform data acquired by the second signal reception processor to acquire data set in the first signals by the first communication apparatus.

The wireless communication system further includes a number-of-antennas determiner. The number-of-antennas determiner determines the number of receiving antennas according to a relay apparatus position on the basis of information regarding communication quality between the first communication apparatus and the relay apparatus at the relay apparatus position. For example, the number-of-antennas determiner is the number-of-antennas determiners 242,

247, 282, 292, 452, and 457, the analyzer 482, and the analysis apparatus 600. The second signal transmitter of the relay apparatus transmits, to the second communication apparatus, the second signals indicating the waveform data of the first signals received by the respective receiving antennas of the number of receiving antennas determined by the number-of-antennas determiner according to a certain relay apparatus position among the first signals received by the plurality of receiving antennas at the relay apparatus position.

The information regarding the communication quality may be information regarding an angle of elevation between the relay apparatus position and a predetermined position in an area where the first communication apparatus that communicates with the relay apparatus is installed. Alternatively, the information regarding the communication quality may be information regarding a population density or terminal density in the area where the first communication apparatus that communicates with the relay apparatus is installed.

The information regarding the communication quality may also be information regarding reception quality of the first signals obtained when the first signal reception processor of the second communication apparatus performs reception processing on the first signals received by the receiving antennas when the relay apparatus has been previously located at the relay apparatus position or near the relay apparatus position. The information regarding the communication quality may also be information regarding an interference signal measured by a measurement apparatus. The information regarding the communication quality may also be one or both of the number of first communication apparatuses estimated based on the first signals received by the respective plurality of receiving antennas or arrival directions of the first signals.

The second communication apparatus may further include an instructor. The instructor issues an instruction to increase the number of receiving antennas to the number-of-antennas determiner in a case where deterioration in the communication quality is detected during the reception processing in the first signal reception processor. In a case of receiving the instruction to increase the number of receiving antennas, the number-of-antennas determiner increases the number of receiving antennas at the relay apparatus position through which the first signals used for the reception processing in which the deterioration in the communication quality has been detected have been received.

The second signal transmitter may transmit the second signals indicating the waveform data of the first signals received by the respective receiving antennas of the number of receiving antennas larger than the number of receiving antennas based on the information regarding the communication quality to the second communication apparatus at a predetermined timing. The first signal reception processor performs the reception processing while changing the number of pieces of the waveform data to be used among pieces of the waveform data obtained from the second signals transmitted by the second signal transmitter at the predetermined timing. The number-of-antennas determiner determines the number of receiving antennas according to the relay apparatus position at the predetermined timing on the basis of the communication quality obtained when the first signal reception processor performs the reception processing while changing the number of pieces of the waveform data to be used.

The relay apparatus may further include a storage and a transmission data reader. The storage stores a reception time in association with the waveform data of the first signals received by the respective plurality of receiving antennas at the reception time. The transmission data reader reads, from the waveform data stored in the storage in association with the reception time, the waveform data of the first signals received by the respective receiving antennas of the number of receiving antennas determined by the number-of-antennas determiner according to the relay apparatus position at the reception time and outputs the waveform data to the second signal transmitter.

The received waveform recorder may generate the waveform data indicating the waveforms of the first signals received at the relay apparatus position by the receiving antennas of the number of receiving antennas determined by the number-of-antennas determiner among the plurality of receiving antennas.

The relay apparatus may further include an antenna controller. The antenna controller performs control at the relay apparatus position so as not to perform reception through a receiving antenna other than the receiving antennas of the number of receiving antennas determined for the relay apparatus position by the number-of-antennas determiner among the plurality of receiving antennas.

The second signal transmitter may transmit the wireless second signals through a plurality of transmission antennas. In this case, the antenna controller may control the second signal transmitter to transmit the second signals through the transmission antennas of the number of transmission antennas corresponding to the number of receiving antennas.

The number-of-antennas determiner may be included in the relay apparatus. Alternatively, the number-of-antennas determiner may be included in the second communication apparatus or a apparatus connected to the second communication apparatus. In this case, the second communication apparatus transmits, to the first communication apparatus, information regarding the number of receiving antennas at the relay apparatus position determined by the number-of-antennas determiner.

The wireless communication system may further include an antenna selector. The antenna selector may select the receiving antennas of the number of receiving antennas for obtaining the waveform data to be transmitted via the second signals so that a distance between the selected receiving antennas increases.

Although the embodiments of the present invention have been described in detail with reference to the drawings, specific configurations are not limited to the embodiments and include design and the like within the scope of the present invention without departing from the gist of the present invention.

REFERENCE SIGNS LIST 1, 101, 101*a*, 101*b*, 102, 102*a*, 103, 104 Wireless communication system
2, 201, 201*a*, 201*b*, 202, 203, 204, 205 Mobile relay station
3, 301 Terminal station
4, 401, 401*a*, 401*b*, 402, 403, 404 Base station
71 Processor
72, 241, 241*a*, 246, 256, 261, 261*a*, 281, 451456, 481 Storage
73 Communication interface
74 User interface
210-1 to 210-N, 270, 330 Antenna
220, 220*b* Terminal communicator
221-1 to 221-N, 265, 420 Receiver 222-1 to 222-N, 224-1 to 224-N Received waveform recorder
223-1 to 223-N, 442-1 to 442-N, 492-1 to 492-N Frequency converter
230, 310 Data storage
240, 240*a*, 245, 280, 285, 290 Transmission data controller
242, 247, 282, 286, 292, 452, 457 Number-of-antennas determiner 243, 453 Antenna selector
244, 244*a* Transmission data reader
250, 250*b* Antenna controller
260, 260*a* Base station communicator
262, 262*a* Controller
263 Transmission data modulator
264, 320, 470 Transmitter
266 Reception processor
291 Estimator
410 Antenna station
430 Base station signal reception processor
440, 440*b* Terminal signal reception processor
441, 441*b*, 491 Distributor
443, 493 Signal processor
444, 494 Terminal signal decoder
450, 455 Control information generator
460 Base station signal transmission processor
480 Instructor
482 Analyzer
490 Analysis reception processor
491 Distributor
500 Waveform sampling apparatus
600 Analysis apparatus

The invention claimed is:
1. A wireless communication system comprising:
a first communication apparatus;
a second communication apparatus; and
a mobile relay apparatus, wherein
the mobile relay apparatus includes
a first signal receiver that receives wireless first signals transmitted from the first communication apparatus through a plurality of receiving antennas,
a received waveform recorder that generates waveform data indicating waveforms of the first signals received by the respective plurality of receiving antennas, and
a second signal transmitter that transmits second signals indicating the waveform data to the second communication apparatus;
the second communication apparatus includes
a second signal receiver that receives the second signals transmitted from the mobile relay apparatus,
a second signal reception processor that performs reception processing of the second signals received by the second signal receiver to acquire the waveform data, and
a first signal reception processor that performs reception processing of the first signals indicated by the waveform data acquired by the second signal reception processor to acquire data set in the first signals by the first communication apparatus,
the wireless communication system includes a number-of-antennas determiner that determines the number of receiving antennas according to a position of the mobile relay apparatus on the basis of information regarding communication quality between the first communication apparatus and the mobile relay apparatus at the position of the mobile relay apparatus, and the second signal transmitter transmits, to the second communication apparatus, the second signals indicating the waveform data of the first signals received by the respective receiving antennas of the number of receiving antennas determined by the number-of-antennas determiner according to the position of the mobile relay apparatus among the first signals received by the respective plurality of receiving antennas at the position of the mobile relay apparatus.

2. The wireless communication system according to claim 1, wherein the information regarding the communication quality is information regarding an angle of elevation between the position of the mobile relay apparatus and a predetermined position in an area where the first communication apparatus that communicates with the mobile relay apparatus at the position of the mobile relay apparatus is installed or information regarding a population density or terminal density in the area where the first communication apparatus that communicates with the mobile relay apparatus at the position of the mobile relay apparatus is installed.

3. The wireless communication system according to claim 1, wherein the information regarding the communication quality is information regarding reception quality of the first signals obtained when the first signal reception processor performs the reception processing on the first signals received by the receiving antennas when the mobile relay apparatus was previously located at the position of the mobile relay apparatus or near the position of the mobile relay apparatus.

4. The wireless communication system according to claim 1, wherein the information regarding the communication quality is information regarding an interference signal measured by a measurement apparatus.

5. The wireless communication system according to claim 1, wherein the information regarding the communication quality is one or both of the number of first communication apparatuses estimated based on the first signals received by the respective plurality of receiving antennas or arrival directions of the first signals.

6. The wireless communication system according to claim 1, wherein the second communication apparatus further includes an instructor that issues an instruction to increase the number of receiving antennas to the number-of-antennas determiner in a case where deterioration in the communication quality is detected during the reception processing in the first signal reception processor, and in a case of receiving the instruction to increase the number of receiving antennas, the number-of-antennas determiner increases the number of receiving antennas at the position of the mobile relay apparatus through which the first signals used for the reception processing in which the deterioration in the communication quality has been detected have been received.

7. The wireless communication system according to claim 1, wherein the second signal transmitter transmits the second signals indicating the waveform data of the first signals received by the respective receiving antennas of the number of receiving antennas larger than the number of receiving antennas based on the information regarding the communication quality to the second communication apparatus at a predetermined timing, the first signal reception processor performs the reception processing while changing the number of pieces of the waveform data to be used among pieces of the waveform data obtained from the second signals transmitted by the second signal transmitter at the predetermined timing, and the number-of-antennas determiner determines the number of receiving antennas according to the position of the mobile relay apparatus at the predetermined timing on the basis of the communication quality obtained when the first signal reception processor performs the reception processing while changing the number of pieces of the waveform data to be used.

8. The wireless communication system according to claim 1, wherein the mobile relay apparatus further includes a storage that stores a reception time in association with the waveform data of the first signals received at the reception time by the respective plurality of receiving antennas, and a transmission data reader that reads, from the waveform data stored in the storage in association with the reception time, the waveform data of the first signals received by the respective receiving antennas of the number of receiving antennas determined by the number-of-antennas determiner according to the position of the mobile relay apparatus at the reception time and outputs the waveform data to the second signal transmitter.

9. The wireless communication system according to claim 1, wherein the received waveform recorder generates the waveform data indicating the waveforms of the first signals received at the position of the mobile relay apparatus by the receiving antennas of the number of receiving antennas determined by the number-of-antennas determiner among the plurality of receiving antennas.

10. The wireless communication system according to claim 1, wherein the mobile relay apparatus further includes an antenna controller that performs control at the position of the mobile relay apparatus so that reception is not performed through a receiving antenna other than the receiving antennas of the number of receiving antennas determined for the position of the mobile relay apparatus by the number-of-antennas determiner among the plurality of receiving antennas.

11. The wireless communication system according to claim 10, wherein the second signal transmitter transmits the wireless second signals through a plurality of transmission antennas, and the antenna controller controls the second signal transmitter so that the second signals are transmitted through the transmission antennas of the number of transmission antennas corresponding to the number of receiving antennas.

12. The wireless communication system according to claim 1, wherein the number-of-antennas determiner is included in the mobile relay apparatus.

13. The wireless communication system according to claim 1, wherein the number-of-antennas determiner is included in the second communication apparatus or a apparatus connected to the second communication apparatus, and the second communication apparatus transmits, to the first communication apparatus, information regarding the number of receiving antennas at the position of the mobile relay apparatus determined by the number-of-antennas determiner.

14. The wireless communication system according to claim 1, further comprising an antenna selector that selects the receiving antennas of the number of receiving antennas for obtaining the waveform data to be transmitted via the second signals so that a distance between the selected receiving antennas increases.

15. The wireless communication system according to claim 1, wherein the mobile relay apparatus is provided in a flying object.

16. The wireless communication system according to claim 1, wherein the mobile relay apparatus is provided in a low earth orbiting satellite, and the first communication apparatus and the second communication apparatus are installed on the earth.

17. The wireless communication system according to claim 2, wherein the mobile relay apparatus further includes a storage that stores a reception time in association with the waveform data of the first signals received at the reception time by the respective plurality of receiving antennas, and a transmission data reader that reads, from the waveform data stored in the storage in association with the reception time, the waveform data of the first signals received by the respective receiving antennas of the number of receiving antennas determined by the number-of-antennas determiner according to the position of the mobile relay apparatus at the reception time and outputs the waveform data to the second signal transmitter.

18. The wireless communication system according to claim 3, wherein the mobile relay apparatus further includes a storage that stores a reception time in association with the waveform data of the first signals received at the reception time by the respective plurality of receiving antennas, and a transmission data reader that reads, from the waveform data stored in the storage in association with the reception time, the waveform data of the first signals received by the respective receiving antennas of the number of receiving antennas determined by the number-of-antennas determiner according to the position of the mobile relay apparatus at the reception time and outputs the waveform data to the second signal transmitter.

19. A mobile relay apparatus included in a wireless communication system including a first communication apparatus, a second communication apparatus, and the mobile relay apparatus, the mobile relay apparatus comprising:

a first signal receiver that receives wireless first signals transmitted from the first communication apparatus through a plurality of receiving antennas;

a received waveform recorder that generates waveform data indicating waveforms of the first signals received by the respective plurality of receiving antennas;

a number-of-antennas determiner that determines the number of receiving antennas according to a position of the mobile relay apparatus on the basis of information regarding communication quality between the first communication apparatus and the mobile relay apparatus at the position of the mobile relay apparatus; and a second signal transmitter that transmits, to the second communication apparatus, second signals indicating the waveform data of the first signals received by the respective receiving antennas of the number of receiving antennas determined by the number-of-antennas determiner according to the position of the mobile relay apparatus among the first signals received by the respective plurality of receiving antennas at the position of the mobile relay apparatus.

20. A wireless communication method performed by a wireless communication system including a first communication apparatus, a second communication apparatus, and a mobile relay apparatus, the wireless communication method comprising:

causing the mobile relay apparatus to receive wireless first signals transmitted from the first communication apparatus through a plurality of receiving antennas;

causing the mobile relay apparatus to generate waveform data indicating waveforms of the first signals received by the plurality of receiving antennas;

causing a number-of-antennas determiner to determine the number of receiving antennas according to a position of the mobile relay apparatus on the basis of information regarding communication quality between the first communication apparatus and the mobile relay apparatus at the position of the mobile relay apparatus;

causing the mobile relay apparatus to transmit, to the second communication apparatus, second signals indicating the waveform data of the first signals received by the respective receiving antennas of the number of receiving antennas determined according to the position of the mobile relay apparatus among the first signals received by the respective plurality of receiving antennas at the position of the mobile relay apparatus;

causing the second communication apparatus to receive the second signals transmitted from the mobile relay apparatus;

causing the second communication apparatus to perform reception processing of the second signals received to acquire the waveform data; and causing the second communication apparatus to perform reception processing of the first signals indicated by the waveform data acquired to acquire data set in the first signals by the first communication apparatus.

* * * * *